US012764006B2

(12) United States Patent
Ding et al.

(10) Patent No.: US 12,764,006 B2
(45) Date of Patent: Oct. 13, 2026

(54) COMMUNICATION APPARATUS AND COMMUNICATION METHOD FOR DUAL STREAM DUAL CARRIER MODULATION

(71) Applicant: Panasonic Intellectual Property Corporation of America, Torrance, CA (US)

(72) Inventors: Yanyi Ding, Singapore (SG); Yoshio Urabe, Nara (JP); Hiroyuki Motozuka, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 38 days.

(21) Appl. No.: 18/879,149

(22) PCT Filed: Jul. 7, 2023

(86) PCT No.: PCT/SG2023/050477
§ 371 (c)(1),
(2) Date: Dec. 26, 2024

(87) PCT Pub. No.: WO2024/019659
PCT Pub. Date: Jan. 25, 2024

(65) Prior Publication Data

US 2025/0385819 A1 Dec. 18, 2025

(30) Foreign Application Priority Data

Jul. 22, 2022 (SG) ........................... 10202250554A

(51) Int. Cl.
*H04L 27/28* (2006.01)
*H04L 5/00* (2006.01)
*H04L 27/26* (2006.01)

(52) U.S. Cl.
CPC ........ *H04L 27/2602* (2013.01); *H04L 5/0023* (2013.01); *H04L 27/28* (2013.01); *H04L 27/2634* (2013.01)

(58) Field of Classification Search
CPC . H04L 27/2602; H04L 27/2634; H04L 27/28; H04L 5/0023
(Continued)

(56) References Cited

U.S. PATENT DOCUMENTS

2020/0014439 A1 1/2020 Lomayev et al.
2023/0141487 A1* 5/2023 Chin ................. H04W 52/0235 370/328
2023/0291630 A1* 9/2023 Hosseini ............... H04W 16/14

FOREIGN PATENT DOCUMENTS

JP 2021083118 A 5/2021

OTHER PUBLICATIONS

Extended European Search Report, dated Sep. 29, 2025, for European Patent Application No. 23843468.2. (9 pages).
(Continued)

*Primary Examiner* — Dominic D Saltarelli
(74) *Attorney, Agent, or Firm* — Seed Intellectual Property Law Group LLP

(57) ABSTRACT

The present disclosure provides a communication apparatus and a communication method for dual stream dual carrier modulation DCM), the communication apparatus comprising: circuitry, which, in operation, is configured to set first information indicating whether a mapping of two or more modulation symbols modulated from an information bit of a signal to two or more subcarriers is applied across two or more spatial streams of an orthogonal frequency division multiplexing (OFDM) symbol and second information indicating whether a data rate adjustment is applied to the signal; and a transmitter, which, in operation, transmits the signal with the mapping of the two or more modulation symbols
(Continued)

across the two or more spatial streams and/or the data rate adjustment, the signal comprising the first information and the second information.

19 Claims, 40 Drawing Sheets

(58) Field of Classification Search
USPC .......................................................... 375/262
See application file for complete search history.

(56) References Cited

OTHER PUBLICATIONS

IEEE Computer Society, "IEEE Standard for Information technology-Telecommunications and information exchange between systems, Local and metropolitan area networks—Specific requirements; Part 11: Wireless LAN Medium Access Control (MAC) and Physical Layer (PHY) Specifications," IEEE Std 802.11™-2016 (Revision of IEEE Std 802.11-2012) Dec. 7, 2016, 3534 pages.

IEEE Computer Society, "Draft Standard for Information technology-Tele-communications and information exchange between systems Local and metropolitan area networks—Specific requirements; Part 11: Wireless LAN Medium Access Control (MAC) and Physical Layer (PHY) Specifications; Amendment 8: Enhancements for extremely high throughput (EHT)," IEEE P802.11be™/D2.0, LAN/MAN Standards Committee of the IEEE Computer Society, (Revision of IEEE P802.11REVme™/D1.2) May 2022, 873 pages.

IEEE SA Standards Board, "IEEE Standard for Information technology-Telecommunications and information exchange between systems, Local and metropolitan area networks—Specific requirements; Part 11: Wireless LAN Medium Access Control (MAC) and Physical Layer (PHY) Specifications; Amendment 1: Enhancements for High-Efficiency WLAN," IEEE Computer Society, IEEE Std 802.11ax™-2021 (Amendment to IEEE Std 802.11™-2020) Feb. 9, 2021, 767 pages.

International Search Report, dated Dec. 18, 2023, for International Application No. PCT/SG2023/050477. (3 pages).

Doğukan et al., "Diversity Enhancement for DUP Mode," doc.: IEEE 802.11-21/0368r1, Vestel & Koç University, Mar. 3, 2021. (9 pages).

Office Action, dated Jun. 30, 2026, for Indian Patent Application No. 202417105092. (6 pages)(with English Translation).

* cited by examiner

3200

COMMUNICATION APPARATUS AND COMMUNICATION METHOD FOR DUAL STREAM DUAL CARRIER MODULATION

TECHNICAL FIELD

The present disclosure relates to communication apparatuses and methods for subcarriers modulation, and more particularly for subcarriers modulation across multiple spatial streams.

BACKGROUND

Dual Carrier Modulation (DCM) scheme is a modulation scheme with frequency diversity to provide a lower data rate, extend communication range and reduce Packet Error Rate (PER), especially when interferences are present.

According to 802.11be Extremely High Throughput draft, DCM is only applicable to Binary Phase Shirt Keying (BPSK), rate-½ coding and single spatial stream (SS) non-multi-user multiple input and multiple output (non-MU-MIMO) transmission. Extending DCM to two or more spatial streams is a good way to add on spatial diversity to the transmission. However, with more than one spatial stream used, the communication range and transmission reliability will be reduced.

There is thus a need for communication apparatuses and methods for carriers (or subcarriers) modulation to address the issues, more particularly, to extend subcarrier modulations across two or more spatial, space-time, space-frequency or transmit streams to support multiple stream transmissions.

Furthermore, other desirable features and characteristics will become apparent from the subsequent detailed description and the appended claims, taken in conjunction with the accompanying drawings and this background of the disclosure.

SUMMARY

Non-limiting and exemplary embodiments facilitate providing communication apparatuses and communication methods for subcarriers modulation across multiple spatial streams in context of WLAN.

In a first aspect, the present disclosure provides a first communication apparatus comprising: circuitry, which, in operation, is configured to set first information indicating whether a mapping of two or more modulation symbols modulated from an information bit of a signal to two or more subcarriers is applied across two or more spatial streams of an orthogonal frequency division multiplexing (OFDM) symbol and second information indicating whether a data rate adjustment is applied to the signal; and a transmitter, which, in operation, transmits the signal with the mapping of the two or more modulation symbols across the two or more spatial streams and/or the data rate adjustment, the signal comprising the first information and the second information.

In a second aspect, the present disclosure provides a second communication apparatus: a receiver, which, in operation, receives a signal comprising first information indicating whether a mapping of two or more modulation symbols modulated from an information bit of the signal to two or more subcarriers is applied across two or more spatial streams of an OFDM symbol and second information indicating whether a data rate adjustment is applied to the signal; and circuitry, which, in operation, is configured to decode and demodulate the signal to obtain information of the information bit mapped to the two or more spatial streams.

In a third aspect, the present disclosure provides a communication method implemented by a first communication apparatus comprising: setting first information indicating whether a mapping of two or more modulation symbols modulated from an information bit of a signal to two or more subcarriers is applied across two or more spatial streams of an OFDM symbol and second information indicating whether a data rate adjustment is applied to the signal; and transmitting the signal with the mapping of the two or more modulation symbols across the two or more spatial streams and/or the data rate adjustment, the signal comprising the first information and the second information.

In a fourth aspect, the present disclosure provides a communication method implemented by a second communication apparatus comprising: receiving a signal comprising first information indicating whether a mapping of two or more modulation symbols modulated from an information bit of the signal to two or more subcarriers is applied across two or more spatial streams of an OFDM symbol and second information indicating whether a data rate adjustment is applied to the signal; and decoding and demodulating the signal to obtain information of the information bit mapped to the two or more spatial streams.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

Embodiments of the disclosure will be better understood and readily apparent to one of ordinary skilled in the art from the following written description, by way of example only, and in conjunction with the drawings, in which.

Figure 1:
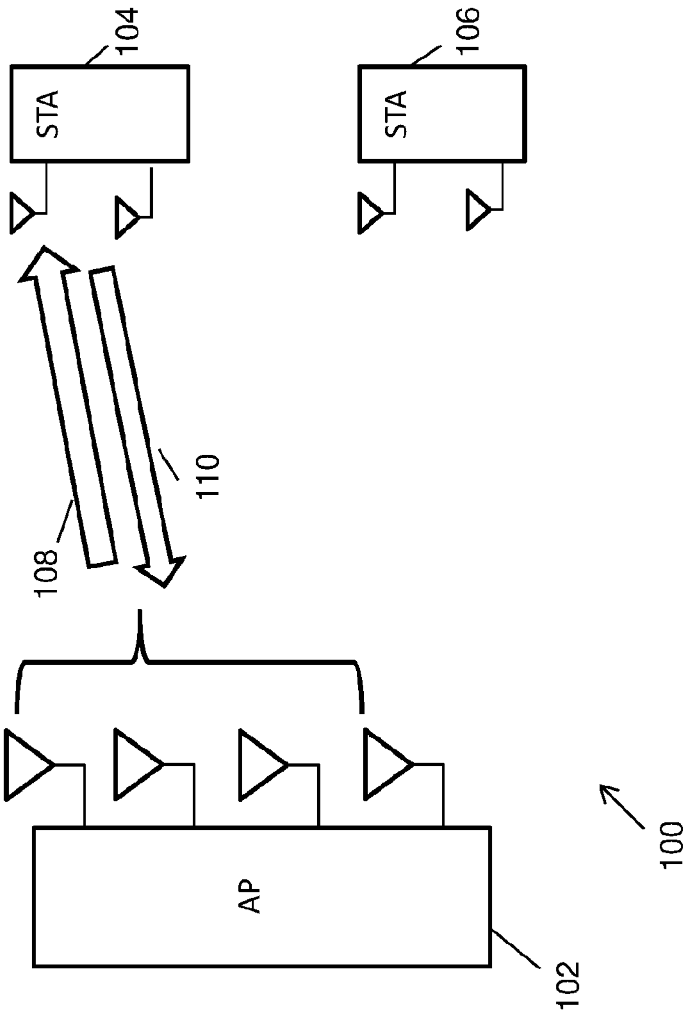
FIG. 1 depicts a schematic diagram illustrating a single-user (SU) communication between an access point (AP) and a station (STA) in a MIMO (multiple-input multiple-output) wireless network.

Skilled artisans will appreciate that elements in the figures are illustrated for simplicity and clarity and have not necessarily been depicted to scale. For example, the dimensions of some of the elements in the illustrations, block diagrams or flow charts may be exaggerated in respect to other elements to help an accurate understanding of the present embodiments.

DETAILED DESCRIPTION

Some embodiments of the present disclosure will be described, by way of example only, with reference to the drawings. Like reference numerals and characters in the drawings refer to like elements or equivalents.

In the following paragraphs, certain exemplifying embodiments are explained with reference to an access point (AP) and a station (STA) for subcarriers modulation across multiple spatial streams, especially in a multiple-input multiple-output (MIMO) wireless network.

In the context of IEEE 802.11 (Wi-Fi) technologies, a station, which is interchangeably referred to as a STA, is a communication apparatus that has the capability to use the 802.11 protocol. Based on the IEEE 802.11-2016 definition, a STA can be any device that contains an IEEE 802.11-conformant media access control (MAC) and physical layer (PHY) interface to the wireless medium (WM).

For example, a STA may be a laptop, a desktop personal computer (PC), a personal digital assistant (PDA), an access point or a Wi-Fi phone in a wireless local area network (WLAN) environment. The STA may be fixed or mobile. In the WLAN environment, the terms "STA", "wireless client", "user", "user device", and "node" are often used interchangeably.

Likewise, an AP, which may be interchangeably referred to as a wireless access point (WAP) in the context of IEEE 802.11 (Wi-Fi) technologies, is a communication apparatus that allows STAs in a WLAN to connect to a wired network. The AP usually connects to a router (via a wired network) as a standalone device, but it can also be integrated with or employed in the router.

As mentioned above, a STA in a WLAN may work as an AP at a different occasion, and vice versa. This is because communication apparatuses in the context of IEEE 802.11 (Wi-Fi) technologies may include both STA hardware components and AP hardware components. In this manner, the communication apparatuses may switch between a STA mode and an AP mode, based on actual WLAN conditions and/or requirements.

In a MIMO wireless network, "multiple" refers to multiple antennas used simultaneously for transmission and multiple antennas used simultaneously for reception, over a radio channel. In this regard, "multiple-input" refers to multiple transmitter antennas, which input a radio signal into the channel, and "multiple-output" refers to multiple receiver antennas, which receive the radio signal from the channel and into the receiver. For example, in an N×M MIMO network system, N is the number of transmitter antennas, M is the number of receiver antennas, and N may or may not be equal to M. For the sake of simplicity, the respective numbers of transmitter antennas and receiver antennas are not discussed further in the present disclosure.

In a MIMO wireless network, single-user (SU) communications and multi-user (MU) communications can be deployed for communications between communication apparatuses such as APs and STAs. MIMO wireless network has benefits like spatial multiplexing and spatial diversity, which enable higher data rates and robustness through the use of multiple spatial streams.

In various embodiments below, each of the terms "channel" and "subchannel" may be used interchangeably with any one of "band", "subband" and "frequency segments".

FIG. 1 depicts a schematic diagram illustrating a SU communication 100 between an AP 102 and a STA 104 in a MIMO wireless network. As shown, the MIMO wireless network may include one or more STAs (e.g., STA 104, STA 106, etc.). If the SU communication 100 in a channel is carried out over whole channel bandwidth, it is called full bandwidth SU communication. If the SU communication 100 in a channel is carried out over a part of the channel bandwidth (e.g., one or more 20 MHz subchannels within the channel is punctured), it is called punctured SU communication. In the SU communication 100, the AP 102 transmits multiple space-time streams using multiple antennas (e.g., four antennas as shown in FIG. 1) with all the space-time streams directed to a single communication apparatus, i.e., the STA 104. For the sake of simplicity, the multiple space-time streams directed to the STA 104 are illustrated as a grouped data transmission arrow 108 directed to the STA 104.

The SU communication 100 can be configured for bi-directional transmissions. As shown in FIG. 1, in the SU communication 100, the STA 104 may transmit multiple space-time streams using multiple antennas (e.g., two antennas as shown in FIG. 1) with all the space-time streams directed to the AP 102. For the sake of simplicity, the multiple space-time streams directed to the AP 102 are illustrated as a grouped data transmission arrow 110 directed to the AP 102.

As such, the SU communication 100 depicted in FIG. 1 enables both uplink and downlink SU transmissions in a MIMO wireless network.

Figure 2:
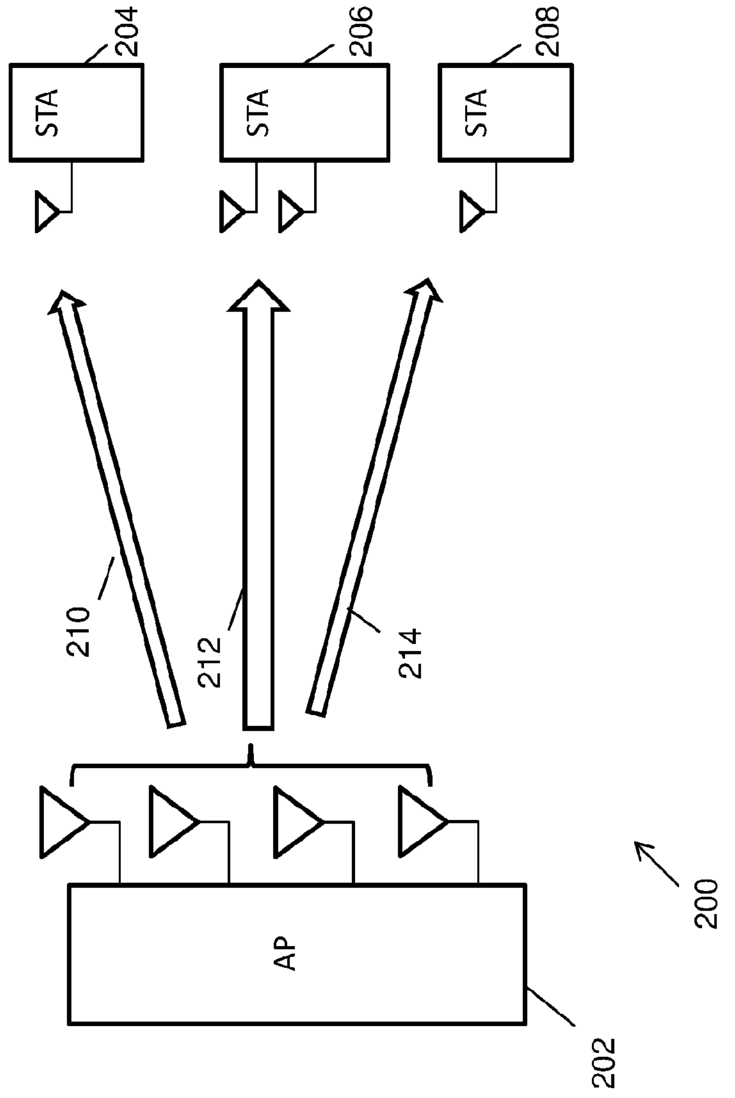
FIG. 2 depicts a schematic diagram illustrating downlink multi-user (MU) communication between an AP and multiple STAs in a MIMO wireless network.

FIG. 2 depicts a schematic diagram illustrating a downlink MU (multiple-user) communication 200 between an AP 202 and multiple STAs 204, 206, 208 in a MIMO wireless network. The MIMO wireless network may include one or more STAs (e.g., STA 204, STA 206, STA 208, etc.). The MU communication 200 can be an OFDMA (orthogonal frequency division multiple access) communications or a MU-MIMO communication. For an OFDMA communication in a channel, the AP 202 transmits multiple streams simultaneously to the STAs 204, 206, 208 in the network at different resource units (RUS) within the channel bandwidth. For a MU-MIMO communication in a channel, the AP 202 transmits multiple streams simultaneously to the STAs 204, 206, 208 at same RU(s) within the channel bandwidth using multiple antennas via spatial mapping or precoding techniques. If the RU(s) for the OFDMA or MU-MIMO communication occupies whole channel bandwidth, the OFDMA or MU-MIMO communications is called full bandwidth OFDMA or MU-MIMO communications. If the RU(s) for the OFDMA or MU-MIMO communication occupies a part of channel bandwidth (e.g., one or more 20 MHz subchannel within the channel is punctured), the OFDMA or MU-MIMO communication is called punctured OFDMA or MU-MIMO communications. For example, two space-time streams may be directed to the STA 206, another space-time stream may be directed to the STA 204, and yet another space-time stream may be directed to the STA 208. For the sake of simplicity, the two space-time streams directed to the STA 206 are illustrated as a grouped data transmission arrow 212, the space-time stream directed to the STA 204 is illustrated as a data transmission arrow 210, and the space-time stream directed to the STA 208 is illustrated as a data transmission arrow 214.

To enable uplink MU transmissions, trigger-based communication is provided to the MIMO wireless network. In this regard, FIG. 3 depicts a schematic diagram illustrating a trigger-based (TB) uplink MU communication 300 between an AP 302 and multiple STAs 304, 306, 308 in a MIMO wireless network.

Since there are multiple STAs 304, 306, 308 respectively participating in the trigger-based uplink MU communication, the AP 302 needs to coordinate simultaneous transmissions of multiple STAs 304, 306, 308.

Figure 3:
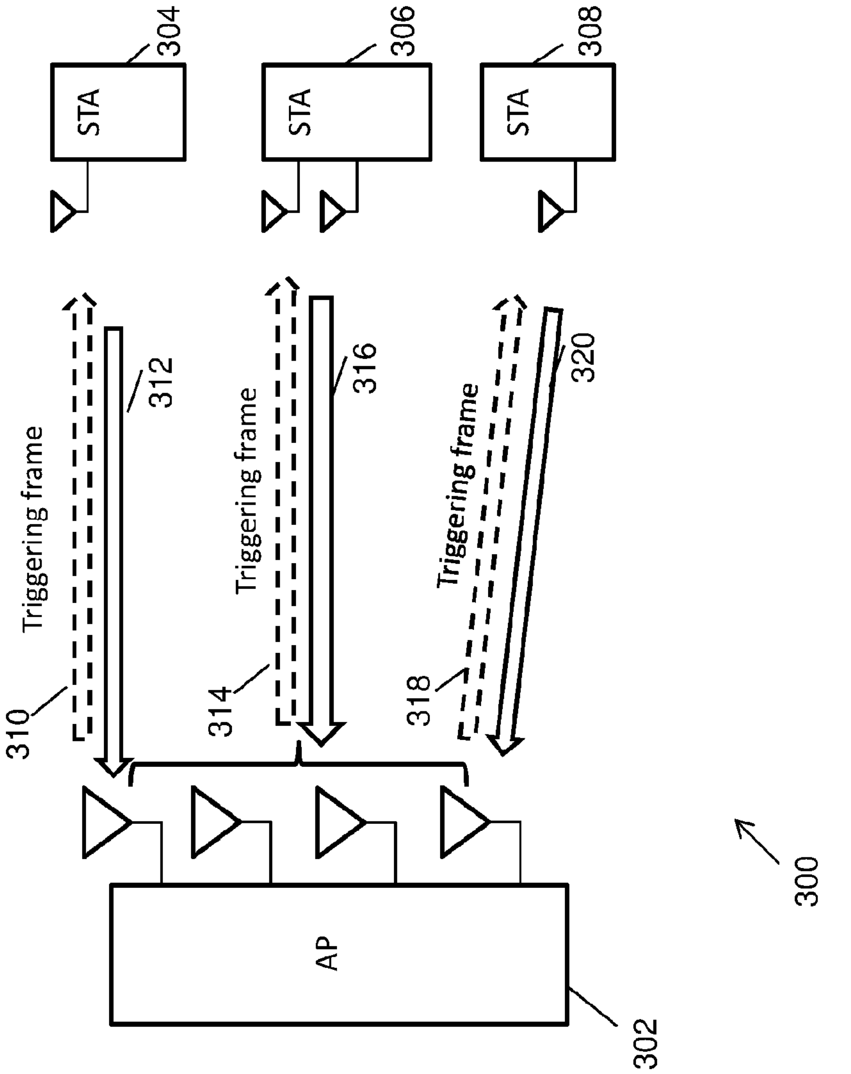
FIG. 3 depicts a schematic diagram illustrating a trigger-based (TB) uplink MU communication between an AP and multiple STAs in a MIMO wireless network.

To do so, as shown in FIG. 3, the AP 302 transmits triggering frames 310, 314, 318 simultaneously to STAs 304, 306, 308 respectively to indicate user-specific resource allocation information (e.g., the number of space-time streams, a starting STS number and the allocated RUs) that each STA can use. In response to the triggering frames, STAs 304, 306, 308 may then transmit their respective space-time streams simultaneously to the AP 302 according to the user-specific resource allocation information indicated in the triggering frames 310, 314, 318. For example, two space-time streams may be directed to the AP 302 from STA 306, another space-time stream may be directed to the AP 302 from STA 304, and yet another space-time stream may be directed to the AP 302 from STA 308. For the sake of simplicity, the two space-time streams directed to the AP 302 from STA 306 are illustrated as a grouped data transmission arrow 316, the space-time stream directed to the AP 302 from STA 304 is illustrated as a data transmission arrow 312, and the space-time stream directed to the AP 302 from STA 308 is illustrated as a data transmission arrow 320.

Due to packet/PPDU (physical layer protocol data unit) based transmission in the Enhanced Distributed Channel Access (EDCA) mechanism and distributed MAC (medium access control) scheme in 802.11 WLAN, frequency and spatial resource scheduling is performed on a packet basis. In other words, resource allocation information is on a PPDU basis in the EDCA mechanism.

WLAN supports non-trigger-based communications as illustrated in FIGS. 1 and 2 and trigger-based communications as illustrated in FIG. 3. In non-trigger-based communications, a communication apparatus transmits a PPDU to one other communication apparatus or more than one other communication apparatus in an unsolicited manner. In trigger-based communications, a communication apparatus transmits a PPDU to one other communication apparatus or more than one other communication apparatus only after a soliciting triggering frame is received.

Figure 4:
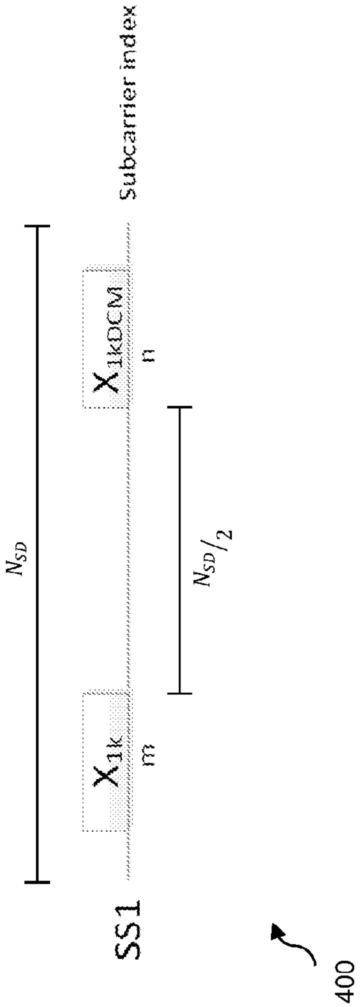
FIG. 4 shows a block diagram illustrating a Dual Carrier Modulation (DCM) scheme applied to an information bit from a spatial stream (SS) of an orthogonal frequency division multiplexing (OFDM) symbol.

As mentioned earlier, DCM scheme is a modulation scheme with frequency diversity to provide a lower data rate, extend communication range and reduce Packet Error Rate (PER), especially when interferences are present. FIG. 4 shows a block diagram 400 illustrating a DCM scheme applied to an information bit from a spatial stream (SS) of an orthogonal frequency division multiplexing (OFDM) symbol. In a typical DCM scheme, an information bit from a spatial stream is modulated into two modulation symbols using different modulation mapping, i.e., mapped to a pair of subcarriers (m, n) within a OFDM symbol. According to 802.11be EHT, the DCM scheme is applicable only to a single spatial stream. The pair of subcarriers (m, n) are typically separated far apart in frequency in the spatial stream (e.g., separated by $N_{SD}/2$ where $N_{SD}$ is the number of data subcarriers per OFDM symbol or the number of data subcarriers within the subband (e.g., 20/40/80 MHz subband)).

Figure 5:
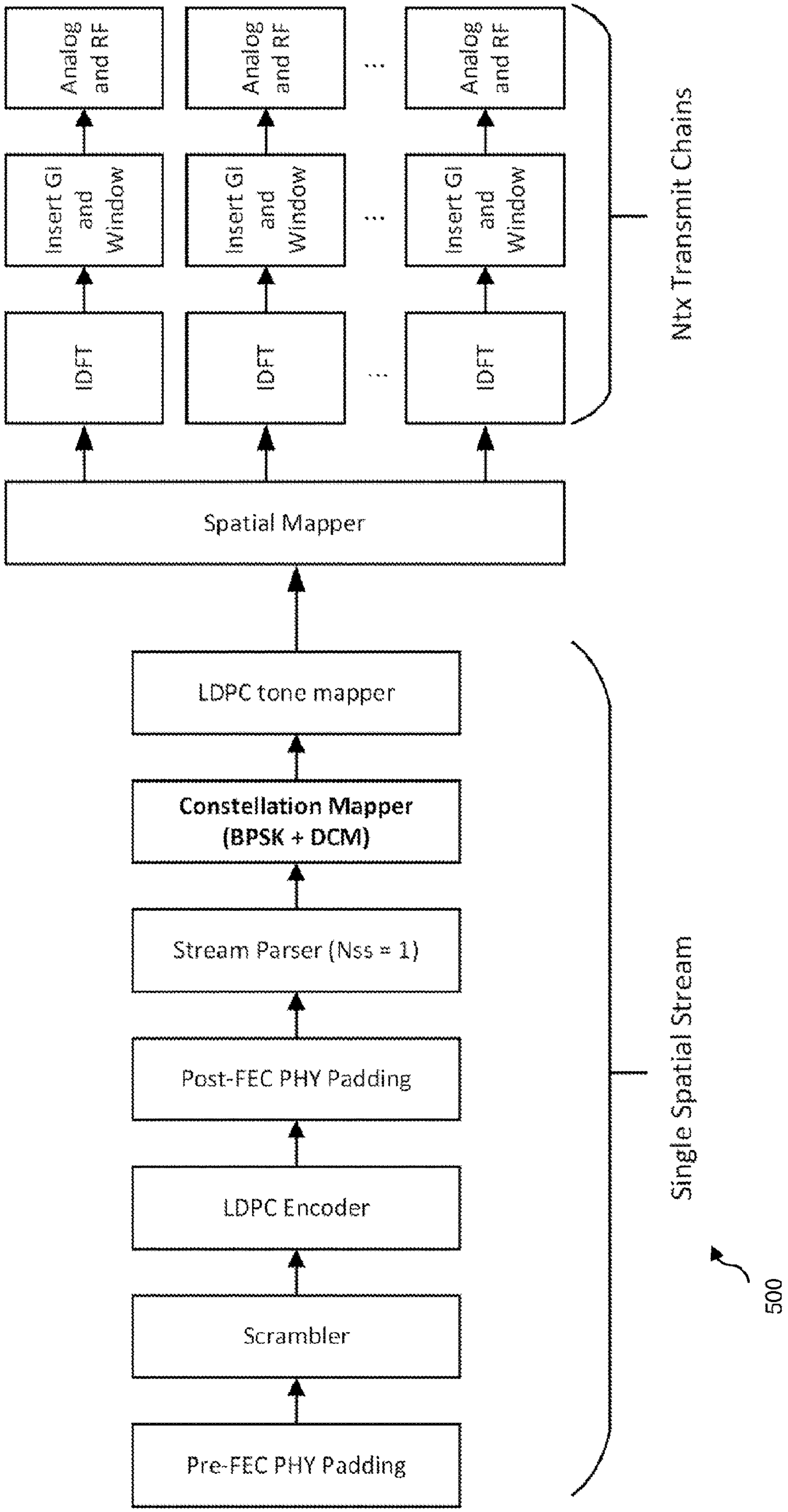
FIG. 5 shows a transmit block diagram illustrating a processing of a data field using a typical DCM scheme.

FIG. 5 shows a transmit block diagram 500 illustrating a processing of a data field using a typical DCM scheme. The data field can be generated consisting of the following processing blocks. The transmitter processing may start with a Pre-Forward Error Correction (FEC) Physical Layer (PHY) Padding unit where redundant information is added to the data bits before the data is output to a Scrambler for scrambling the data bits to reduce long runs of identical bits. A Low Density Parity Check (LDPC) encoder unit encodes the data bits before the encoded data is output to a Post-FEC PHY Padding unit to add padding bits such that the number of bits match the number of bits required for a symbol.

A Stream Parser unit then divides the encoded bits into multiple blocks that are sent through multiple spatial streams ($N_{SS}$ is the number of spatial streams) correspondingly. Here, the $N_{SS}$ is 1 indicating a single spatial stream. The single spatial stream corresponding to a block of the encoded bits that is sent to a Constellation Mapper unit and a LDPC Tone Mapper unit. The Constellation Mapper unit maps respective blocks of the encoded bits into constellation points or complex numbers (herein referred to as modulation symbols) using a selected modulation scheme (in this case, BPSK and DCM), and maps respective modulation symbols to two OFDM subcarriers (DCM) and ensure respective OFDM subcarriers are separated by a sufficient distance to maximize frequency diversity gain. The LDPC Tone Mapper unit further interleaves the modulation symbols within an OFDM symbol to protect it against burst errors and overcome frequency selective fading better.

Subsequently, the spatial stream will be sent to a Spatial Mapper unit to map onto multiple transmit chains (three transmit chains are illustrated, each indicated using an arrow pointing out from the Spatial Mapper unit). Each transmit chain is sent to an Inverse Fourier Discrete Fourier Transform (IDFT) unit. Each IDFT unit converts OFDM subcarriers on the transmit chain, which are frequency-domain data, into time-domain data for transmission. The time-domain data of the IDFT unit is then sent to an Insert Guard Interval (GI) And Window unit to insert GI at the start of each OFDM symbol in the transmit chain where each OFDM symbol may also be windowed to minimize adjacent channel interference. The time-domain data in each transmit chain is then sent to an Analog And Radio Frequency (RF) unit to prepare the data for transmission through an antenna.

In 802.11be EHT draft, DCM can be applied for EHT-Modulation coding scheme (MCS) 14 and EHT-MCS 15. In EHT-MCS 14, BPSK, rate-½ coding scheme, DCM and duplication (DUP) modes are applied; whereas, in EHT-MCS 15, BPSK, rate-½ coding scheme and DCM are applied. EHT DUP mode is a mode where the transmitted data in the payload portion of the PPDU is duplicated by ½ basis in frequency. The EHT DUP mode can reduce data rate in large bandwidth 80/160/320 MHz in 6 GHz band.

Figure 6:
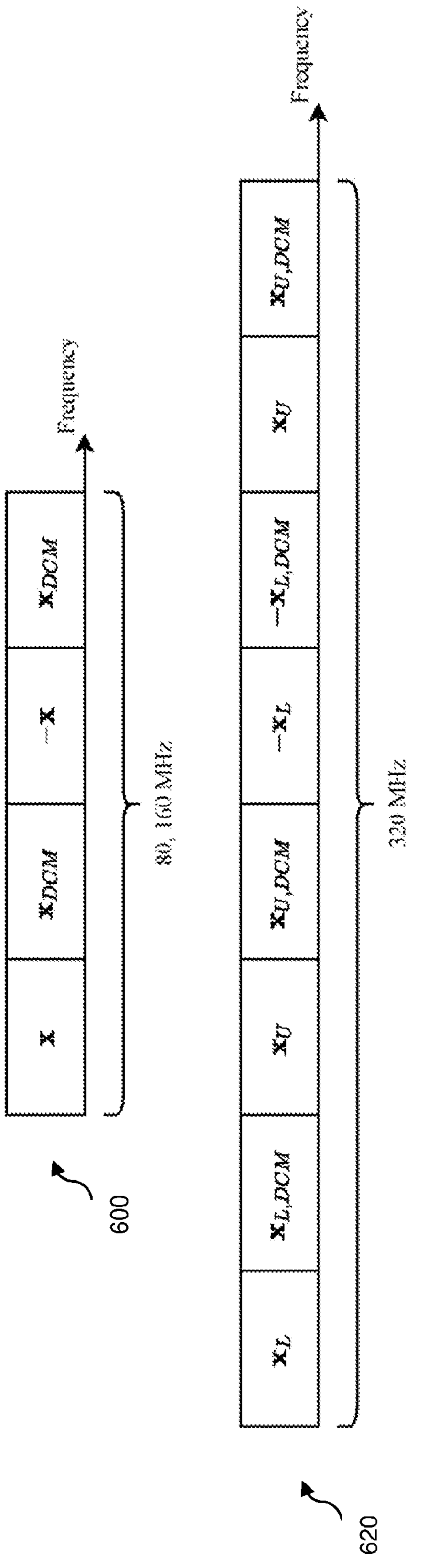
FIG. 6 shows duplicated data in payload portions of an 80/160 MHz physical layer protocol data unit (PPDU) and a 320 MHz PPDU.

FIG. 6 shows duplicated data in payload portions of an 80/160 MHz PPDU 600 and a 320 MHz PPDU 620. In the 80/160 MHz PPDU, the payload portion may contain symbols X and $X_{DCM}$ modulated from same information bits via DCM scheme in 40/80 MHz frequency segment, and also a duplication of the modulated symbols in the remaining 40/80 MHz frequency segment (½ basis in frequency) via DUP mode. The duplication may contain a phase rotation in one or more of the duplicated symbols. In this case, the modulated symbol X is shifted to −X when duplicated. Similarly, in the 320 MHz PPDU, the payload portion may contain symbols $X_L$, $X_{L,}$ DCM, $X_U$ and $X_{U,}$ DCM generated from symbols X and $X_{DCM}$ modulated from same information bits via DCM scheme in 160 MHz frequency segment, where symbols $X_L$ are the lower half part of symbols X; symbols $X_U$ are the upper half part of symbols X; symbols $X_L$, DCM are the lower half part of symbols $X_{DCM}$; symbols $X_U$, DCM are the upper half part of symbols $X_{DCM}$. The payload portion also contains a duplication of the modulated symbols in the remaining 160 MHz frequency segment (½ basis in frequency) via DUP mode.

Figure 7:
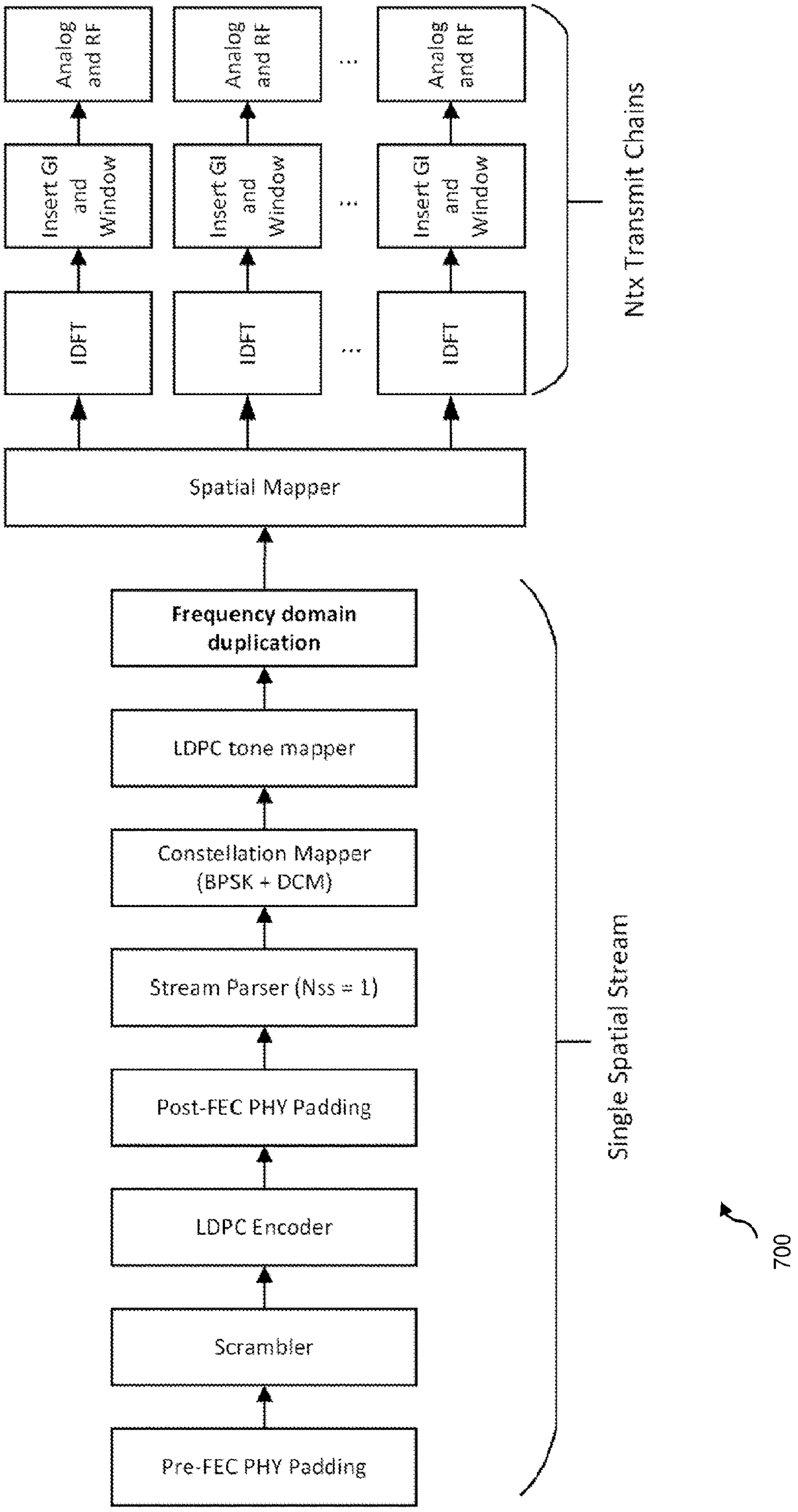
FIG. 7 shows a transmit block diagram illustrating a processing of a data field using typical DCM and duplication (DUP) modes.

FIG. 7 shows a transmit block diagram 700 illustrating a processing of a data field using typical DCM and DUP modes. The transmitter processing is similar to that shown in FIG. 5 using a Pre-FEC PHY Padding unit, a Scrambler unit, a LDPC Encoder unit, a Post-FEC PHY Padding unit, a Stream Parser unit ($N_{SS}$=1), a Constellation Mapper unit and a LDPC Tone Mapper unit to process a single spatial stream, except that after the LDPC tone mapper unit, the spatial stream is sent to a Frequency Domain Duplication unit where the modulated symbols on the spatial stream are duplicated, e.g., by ½ basis in frequency, before it is sent to the Spatial Mapper unit to map onto multiple transmit chains.

In 802.11ax HE, DCM is applicable to only HE-MCSs 0, 1, 3 and 4, and only up to two spatial streams. In the case of two spatial streams, same modulation principle per spatial stream is applied as to a single spatial stream. This will allow frequency diversity gain only.

Figure 8:
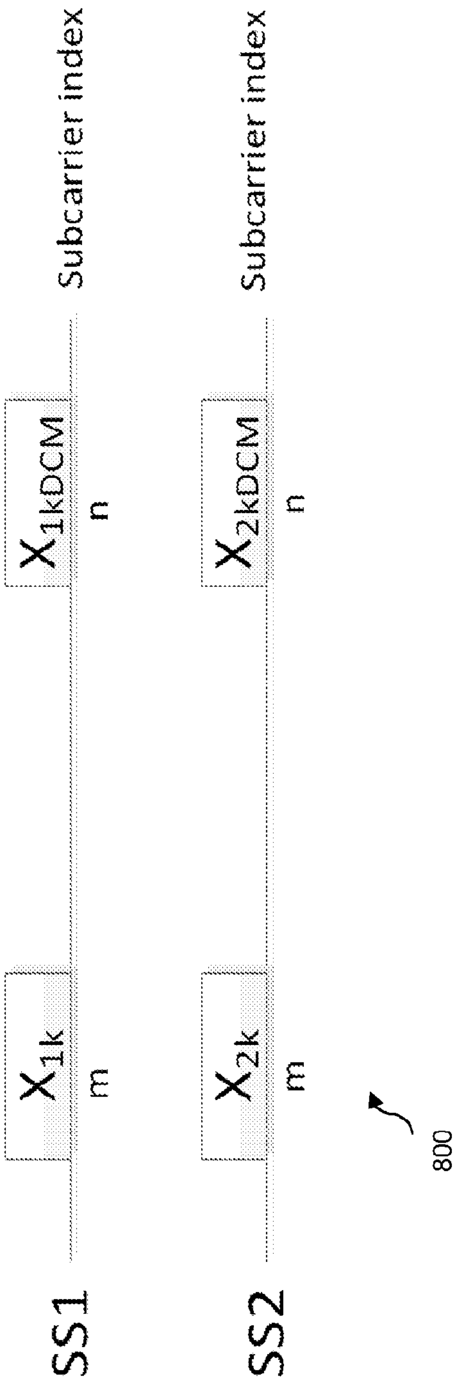
FIG. 8 shows a block diagram illustrating a DCM scheme applied to two information bits across two spatial streams of an OFDM symbol.

FIG. 8 shows a block diagram 800 illustrating a DCM scheme applied to two information bits across two spatial streams (SS1, SS2) of an OFDM symbol. Conventionally, a same modulation principle is applied to two information bits $X_1$, $X_2$ from different spatial streams (SS1, SS2). In particular, each of the information bits $X_1$, $X_2$ is modulated to a pair of symbols ($X_{1k}$ and $X_{1kDCM}$, $X_{2k}$ and $X_{2kDCM}$) mapped to a pair of subcarriers (m, n) within the OFDM symbol in its respective spatial stream (SS1, SS2). Similarly, the pair of subcarriers (m, n) are separated far apart in frequency in the spatial stream (e.g., separated by $N_{SD}/2$ where $N_{SD}$ is the number of data subcarriers per OFDM symbol or the number of data subcarriers within the subband (e.g., 20/40/80 MHz subband).

Figure 9:
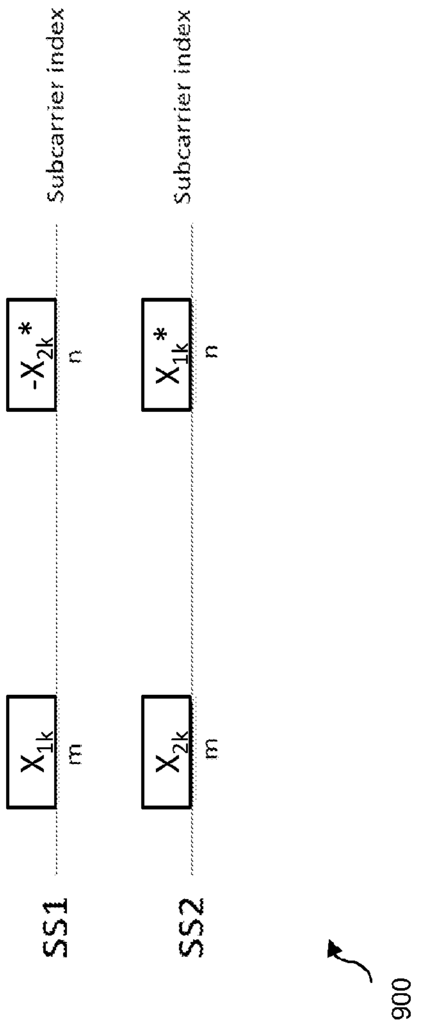
FIG. 9 shows a block diagram illustrating a SFBS scheme applied to two information bits across two spatial streams (SS1, SS2) of an OFDM symbol.

In contrast with DCM, Space-Frequency Diversity Scheme (SFDS) is applied across two spatial streams. An example of SFDS is Space Frequency Block Coding (SFBC). FIG. 9 shows a block diagram 900 illustrating a SFBS scheme applied to two information bits across two spatial streams (SS1, SS2) of an OFDM symbol. In particular, an information bit from the first spatial stream (SS1) is modulated to two modulation symbols $X_{1k}$, $X_{1k}$* mapped to a pair of subcarriers (m, n). One of the modulation symbols (e.g., $X_{1k}$) is mapped to the first subcarrier (m) corresponding to the first spatial stream (SS1) and the other modulation symbol (e.g., $X_{1k}$*) is mapped to the second subcarrier (n) corresponding to the second spatial stream (SS2). Another information bit from a second spatial stream is also modulated to two modulation symbols $X_{2k}$, $X_{2k}$* mapped to the pair of subcarriers (m, n). One of the modulation symbols (e.g., $X_{2k}$) is mapped to the first subcarrier (m) corresponding to the second spatial stream (SS2) and the other modulation symbol (e.g., $X_{2k}$*) is mapped to the second subcarrier (n) corresponding to the first spatial stream (SS1). The pair of sub-carriers (m, n) are separated far apart in frequency in the spatial stream (e.g., separated by $N_{SD}/2$ where $N_{SD}$ is the number of data subcarriers per OFDM symbol or the number of data subcarriers within the subband (e.g., 20/40/80 MHz subband). Besides frequency diversity gain, such SFDS scheme allows spatial diversity gain. In modulation schemes, including SFDS schemes, in which each created stream (e.g., SS1/SS2) includes the same (or overlapped) set of information bits (e.g., $X_1$, $X_2$), the streams may be referred to as, for example, space-frequency streams or transmit streams, alternatively to spatial streams.

As mentioned earlier, in 802.11be EHT, DCM scheme is only applicable to single spatial stream transmission. Extending DCM to two or more spatial streams is a good way to add on spatial diversity to the transmission. However, with more than one spatial stream used, the communication range and transmission reliability will be reduced. There is thus a need for communication apparatuses and methods for carriers (or subcarriers) modulation to address the issues, more particularly, to extend subcarrier modulations across two or more spatial streams to support multiple spatial stream transmissions.

According to the present disclosure, an enhanced frequency diversity scheme is applied to more than one spatial stream to provide higher or extra diversity gain (e.g., spatial diversity and/or antenna diversity) as compared to DCM in 802.11 specification. Additionally or alternatively, a reliability improvement method is applied to improve the reliability to the transmission by reducing data rate and provide further diversity gain.

In various embodiments below, an enhanced frequency diversity scheme refers to a mapping of two or more modulation symbols modulated from an information bit of a signal to two or more subcarriers; whereas a reliability improvement method refers to a data rate adjustment.

The application of enhanced frequency diversity scheme, i.e., a mapping of two or more modulation symbols modulated from an information bit of a signal to two or more subcarriers, and reliability improvement method, i.e., a data rate adjustment, are indicated through first information and second information set by the transmitter AP (or STA), respectively. In one implementation, the application of the enhanced frequency diversity scheme is indicated by the number of spatial stream(s) ($N_{SS}$) and MCS information in the preamble portion of the signal. The enhanced frequency diversity scheme (e.g., enhanced DCM scheme) may be a predefined scheme known by intended receivers, or a scheme explicitly indicated in the preamble portion of the signal.

For example, in an EHT MU PPDU, when MCS 15 is indicated in a User field of an EHT-SIG field of the PPDU, a convention DCM scheme is indicated if $N_{SS}$ (number of spatial stream) field is 1 (same as 802.11be) whereas an enhanced DCM scheme is indicated if $N_{SS}$ field is 2 ($N_{SS}$=2 is reserved in 802.11be).

Alternatively, in future implementation and amendment, such application of enhanced frequency diversity scheme may be indicated by the MCS information only.

Similarly, the application of the reliability improvement method can be either by default with the enhanced frequency diversity scheme or indicated by the $N_{SS}$ and MSC information in the preamble portion of the signal.

For example, in an EHT MU PPDU, when MCS 15 and $N_{SS}$ of 3 is indicated in a User field of an EHT-SIG field of the PPDU, an enhanced DCM scheme with reliability improvement is indicated.

Figure 11:
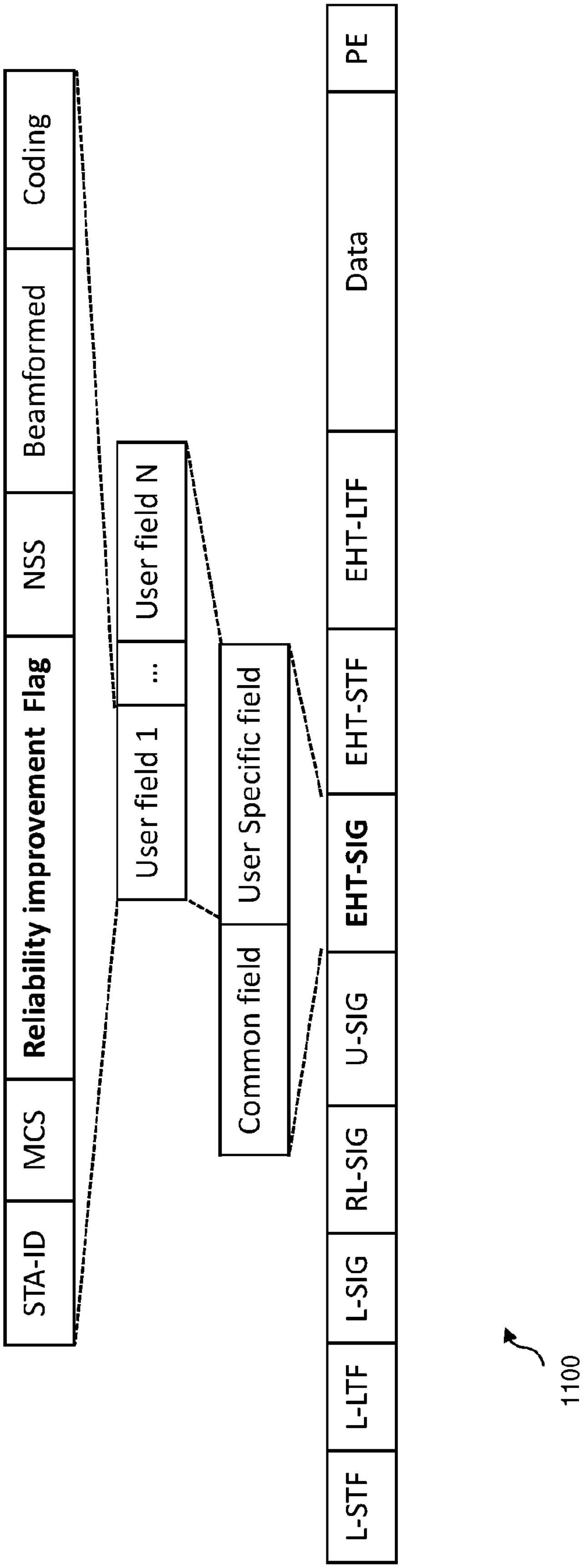
FIG. 11 shows another example EHT PPDU for subcarriers modulation across multiple spatial streams according to an embodiment of the present disclosure.

Alternatively, such application of reliability improvement method is indicated by a separate signal field other than MCS and $N_{SS}$ information such as a reliability improvement flag field shown in FIG. 11.

It is noted that a receiver STA who receives a PPDU with its preamble portion indicating an enhanced frequency diversity scheme is applied, regardless of whether a reliability improvement method is applied, shall follow the predefined/indicated instructions to decode and demodulate the PPDU to get the extra gain.

Figure 10:
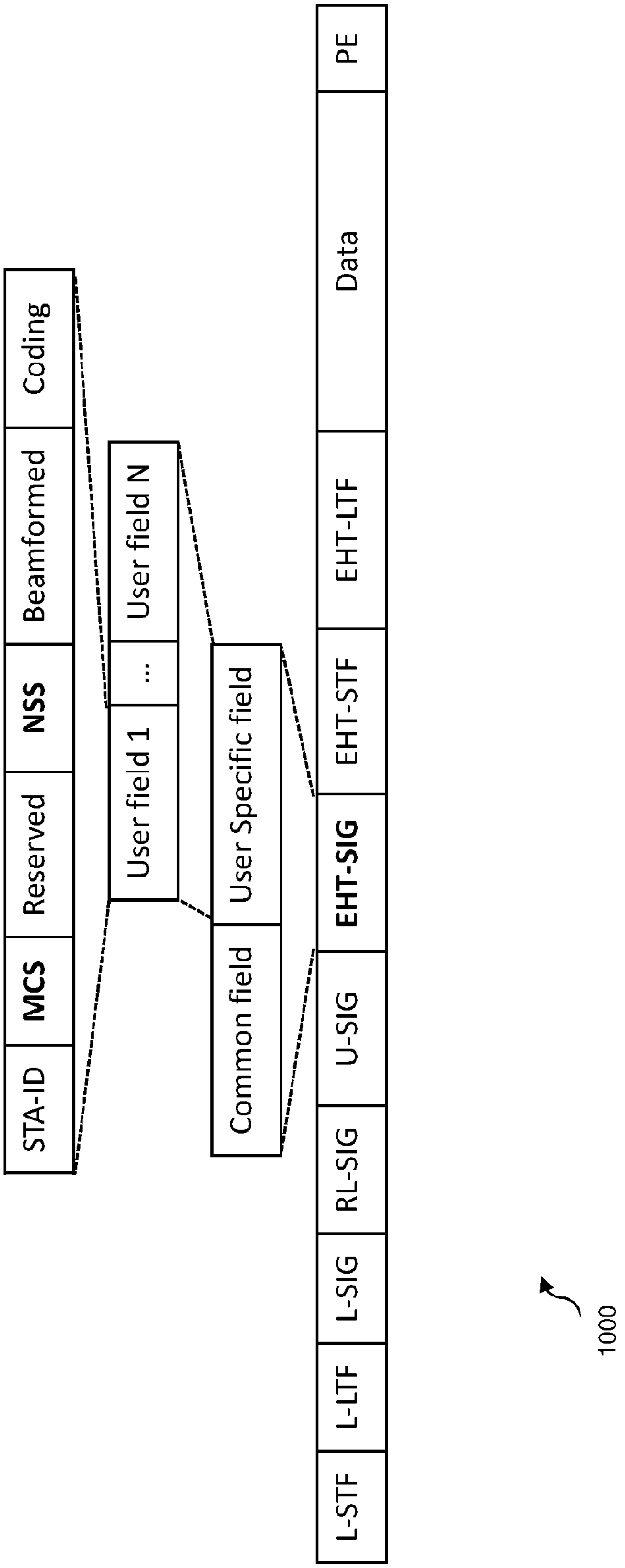
FIG. 10 shows an example Extreme High Throughput (EHT) PPDU for subcarriers modulation across multiple spatial streams according to an embodiment of the present disclosure.

FIG. 10 shows an example EHT PPDU 1000 for subcarriers modulation across multiple spatial streams according to an embodiment of the present disclosure. The EHT PPDU 1000 may comprise a non-High Throughput (Legacy) Short Training field (L-STF), a non-High Throughput (Legacy) Long Training field (L-LTF), a non-High Throughput (Legacy) SIGNAL (L-SIG) field, a Repeated L-SIG (RL-SIG) field, a Universal Signal (U-SIG) field, an EHT-STF, an EHT-LTF), a Data field and a Packet Extension (PE) field. The duration of the L-STF, L-LTF, L-SIG field, RL-SIG field, U-SIG field, EHT-SIG field, EHT-STF are 8 μs, 8 μs, 4 μs, 4 μs, 8 μs, 8 μs and 8 μs respectively, while the EHT-LTF comprises one or more than one EHT-LTF symbol with variable duration depending on the guard interval (GI) and LTF size.

The EHT-SIG field comprises a Common field and a User Specific field. The User Specific field comprises one or more User fields, each User field comprising a STA ID field, a MCS field, a $N_{SS}$ field, a Beamformed field and a Coding field. The MCS field and/or $N_{SS}$ field can provide information on whether an enhanced frequency diversity scheme (e.g., Enhanced DCM) and/or a reliability improvement method is applied. Table 1 first example encoding schemes indicated by MCS field and $N_{SS}$ field, where $N_{SS}$ is either 1 or 2.

TABLE 1

| MCS | Nss | Encoding |
|---|---|---|
| 14 | 1 | Conventional DCM + DUP |
| 15 | 1 | Conventional DCM |
| 14 | 2 | Enhanced DCM + DUP + Reliability improvement |
| 15 | 2 | Enhanced DCM + Reliability improvement |

Table 2 shows second example encoding schemes indicated by MCS field and $N_{SS}$ field, where $N_{SS}$ can be one 1, 2 or 3.

TABLE 2

| MCS | Nss | Encoding |
|---|---|---|
| 14 | 1 | Conventional DCM + DUP |
| 15 | 1 | Conventional DCM |
| 14 | 2 | Enhanced DCM + DUP |
| 15 | 2 | Enhanced DCM |
| 14 | 3 | Enhanced DCM + DUP + Reliability improvement |
| 15 | 3 | Enhanced DCM + Reliability improvement |

FIG. 11 shows another example EHT PPDU 1100 for subcarriers modulation across multiple spatial streams according to an embodiment of the present disclosure. The PPDU 1100 is similar to the PPDU 1000 shown in FIG. 10 except that each user field of the User Specific field of the EHT-SIG field further comprises a Reliability Improvement Flag field which serves as a separate signalling to indicate whether a reliability improvement method is applied whereas the MCS and $N_{SS}$ fields indicate whether an enhanced frequency diversity scheme is applied. Table 3 shows second example encoding schemes indicated by MCS field, $N_{SS}$ field and Reliability Improvement Flag field, where $N_{SS}$ is either 1 or 2. The Reliability improvement flag may be reserved (the values are ignored by receiver(s)) if the $N_{SS}$ field is set to 1. (As indicated with "/" in Table 3.)

TABLE 3

| MCS | Nss | Reliability improvement Flag | Encoding |
|---|---|---|---|
| 14 | 1 | / | Conventional DCM + DUP |
| 15 | 1 | / | Conventional DCM |
| 14 | 2 | 0 | Enhanced DCM + DUP |
| 15 | 2 | 0 | Enhanced DCM |
| 14 | 2 | 1 | Enhanced DCM + DUP + Reliability improvement |
| 15 | 2 | 1 | Enhanced DCM + Reliability improvement |

Advantageously, using these fields to provide information on the application of an enhanced frequency diversity scheme and a reliability improvement method, it can extend DCM to two or more spatial streams and provide spatial diversity gain to DCM and EHT DUP mode without extra signalling bits in the preamble portion of the PPDU or signal.

Figure 12:
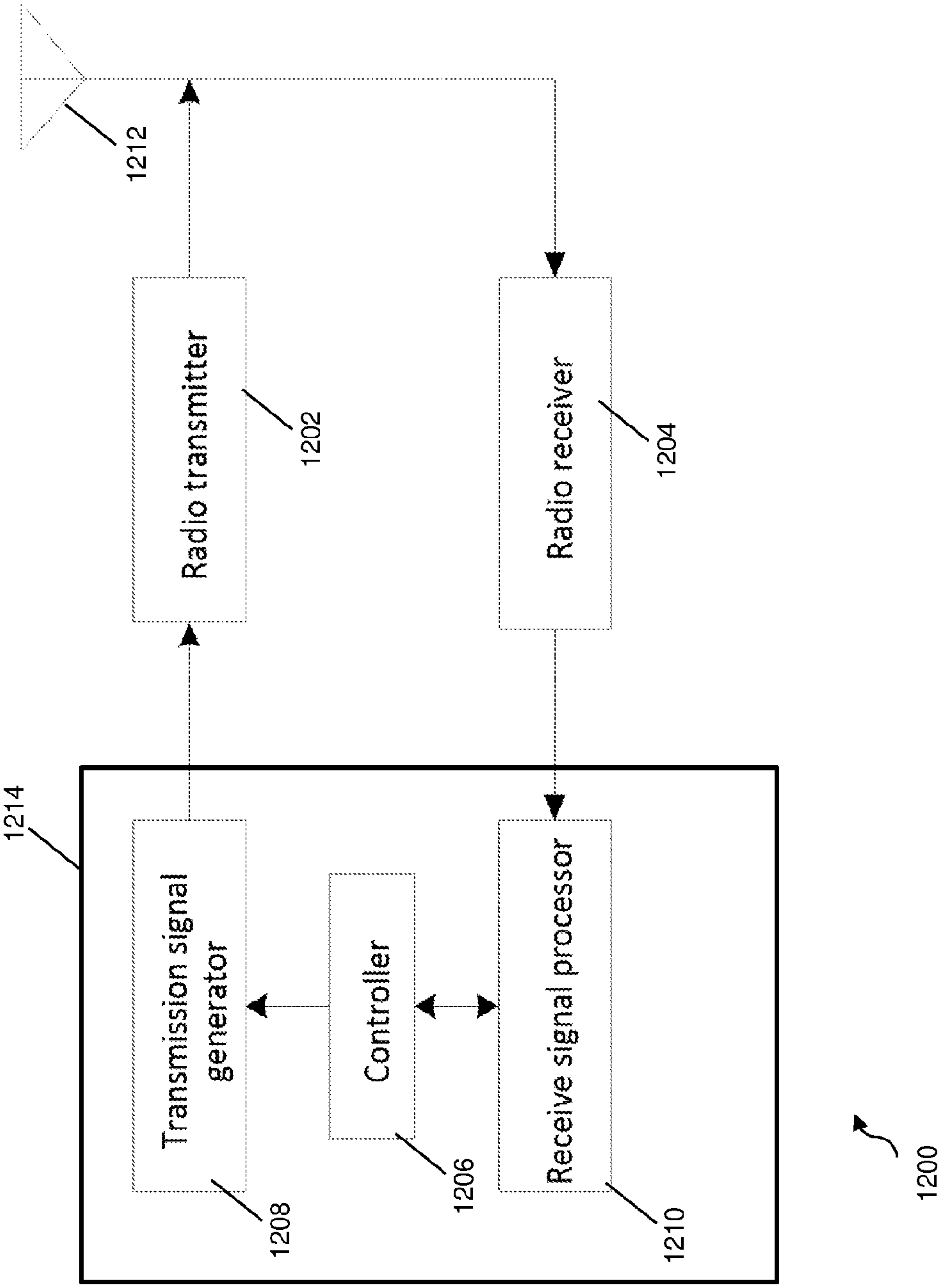
FIG. 12 shows a schematic view of a communication apparatus according to the present disclosure.

FIG. 12 shows a schematic view of a communication apparatus 1200 according to the present disclosure. The communication apparatus 1200 may also be implemented as an AP or a STA.

As shown in FIG. 12, the communication apparatus 1200 may include circuitry 1214, at least one radio transmitter 1202, at least one radio receiver 1204, and at least one antenna 1212 (for the sake of simplicity, only one antenna is depicted in FIG. 12 for illustration purposes). The circuitry 1214 may include at least one controller 1206 for use in software and/or hardware aided execution of tasks that the at least one controller 1206 is designed to perform, including control of communications with one or more other communication apparatuses in a MIMO wireless network. The circuitry 1214 may further include at least one transmission signal generator 1208 and at least one receive signal processor 1210. The at least one controller 1206 may control the at least one transmission signal generator 1208 for generating PPDUs to be sent through the at least one radio transmitter 1202 to one or more other communication apparatuses, wherein the PPDU, for example, may be PPDUs used for downlink transmissions if the communication apparatus 1200 is an AP, or PPDUs used for trigger-based uplink transmissions if the communication apparatus 1200 is a STA. The at least one controller 1206 may control the at least one receive signal processor 1210 for processing MAC frames and PPDUs received through the at least one radio receiver 1204 from the one or more other communication apparatuses under the control of the at least one controller 1206, wherein the PPDU, for example, may be PPDUs used for trigger-based uplink transmissions if the communication apparatus 1200 is an AP, or PPDUs used for downlink transmissions if the communication apparatus 1200 is a STA. The at least one transmission signal generator 1208 and the at least one receive signal processor 1210 may be stand-alone modules of the communication apparatus 1200 that communicate with the at least one controller 1206 for the above-mentioned functions, as shown in FIG. 12. Alternatively, the at least one transmission signal generator 1208 and the at least one receive signal processor 1210 may be included in the at least one controller 1206. It is appreciable to those skilled in the art that the arrangement of these functional modules is flexible and may vary depending on the practical needs and/or requirements. The data processing, storage and other relevant control apparatus can be provided on an appropriate circuit board and/or in chipsets. In various embodiments, when in operation, the at least one radio transmitter 1202, at least one radio receiver 1204, and at least one antenna 1212 may be controlled by the at least one controller 1206.

The communication apparatus 1200, when in operation, may provide functions required for subcarriers modulation across multiple spatial streams. For example, the communication apparatus 1200 may be an AP or a transmitter STA, and the circuitry 1214 (for example the at least one transmission signal generator 1208 of the circuitry 1214, respectively) may be configured to set first information and second information. The first information may indicate whether a mapping of two or more modulation symbols modulated from an information bit of a signal to two or more subcarriers is applied across two or more spatial streams of an OFDM symbol. The second information may indicate whether a data rate adjustment is applied to the signal. The at least one radio transmitter 1202 may transmit the signal with the mapping of the two or more modulation symbols across the two or more spatial streams and/or the data rate adjustment. The signal may comprise both the first information and the second information.

In one embodiment, the circuitry 1214 (for example the at least one transmission signal generator 1208 of the circuitry 1214, respectively) is further configured to set a signal field of the signal relating to a MCS coding scheme (e.g., MCS field) and/or number of spatial streams ($N_{SS}$ field) to comprise the first information and the second information. In an alternative embodiment, the second information is indicated by setting a separate signal field (e.g., Reliability Improvement Flag) field.

Across various embodiments, the mapping of the two or more modulation symbols modulated from the information bit of the signal to the two or more subcarriers applied across the two or more spatial streams of the OFDM symbol comprises one of the followings:

a) a mapping of two of the two or more modulation symbols modulated from the information bit to a first subcarrier of the two or more subcarriers in a first spatial stream of the two or more spatial streams and a second subcarrier of the two or more subcarriers in a second spatial stream of the two or more spatial streams of the OFDM symbol, respectively;

b) a same mapping of two of the two or more modulation symbols modulated from the information bit to the two or more subcarriers in every spatial stream of the two or more spatial streams;

c) a mapping of two of the two or more modulation symbols modulated from a first information bit of the signal to the two or more subcarriers in a first spatial stream of the two or more spatial streams of the OFDM symbol and in a second spatial stream of the two or more spatial streams of an adjacent OFDM symbol, and a mapping of two of the two or more modulation symbol modulated from a second information bit of the signal to the two or more subcarriers in a second spatial stream of the two or more spatial streams of the OFDM symbol and in a first spatial stream of the two or more spatial streams of the adjacent OFDM symbol; and the transmitter transmits the signal through the first spatial streams and the second spatial streams of the OFDM symbol and the adjacent OFDM symbols;

d) a phase rotation to one of the two or more modulation symbols mapped to one of the two or more subcarriers in one of the two or more spatial streams of the OFDM symbol;

e) a sign inversion to one of the two or more modulation symbols mapped to one of the two or more subcarriers in one of the two or more spatial streams of the OFDM symbol;

f) a conjugation to one of the two or more modulation symbols mapped to one of the two or more subcarriers in one of the two or more spatial streams of the OFDM symbol;

g) a switch of two of the two or more modulation symbols mapped to two of the two or more subcarriers in one of the two or more spatial streams;

h) a phase rotation, a sign inversion or a conjugation to one of the two or more modulation symbols mapped to one of the two or more subcarriers in one of the two or more spatial streams of one of one or more duplications of the OFDM symbol;

i) a sign inversion to one of the two or more modulation symbols mapped to one of the two or more subcarriers in one of the two or more spatial streams of one of one or more duplications of the OFDM symbol; and j) a conjugation to one of the two or more modulation symbols mapped to one of the two or more subcarriers in one of the two or more spatial streams of one of one or more duplications of the OFDM symbol.

Across various embodiments, the data rate adjustment comprises one of the followings:

a) a duplication of the OFDM symbol in a payload portion of the signal; and the transmitter transmits the signal comprising the OFDM symbol and one or more duplications of the OFDM symbol next to the OFDM symbol in the payload portion;

b) a duplication of the OFDM symbol block in a payload portion of the signal; and the transmitter transmits the signal comprising a OFDM symbol block and one or more duplications of the OFDM symbol block next to the OFDM symbol block in the payload portion, the OFDM symbol block comprising the OFDM symbol and one or more adjacent OFDM symbols;

c) a switch of two of the two or more modulation symbols mapped to two of the two or more subcarriers in one of the one or more duplications of the OFDM symbol; and d) a frequency duplication of a payload portion of the signal to generate the signal comprising the information bit in a first frequency segment and one or more duplications of the information bit in one or more second frequency segments of the payload portion of the signal.

For example, the communication apparatus 1200 may be a receiver STA, and the at least one radio receiver 1204 may receive a signal comprising first information and second information. The first information may indicate whether a mapping of two or more modulation symbols modulated from an information bit of the signal to two or more subcarriers is applied across two or more spatial streams of an OFDM symbol. The second information may indicate whether a data rate adjustment is applied to the signal. The circuitry 1214 (for example the at least one receive signal processor 1210 of the circuitry 1214, respectively) may be configured to decode and demodulate the signal to obtain information of the information bit mapped to the two or more spatial streams.

Figure 13:
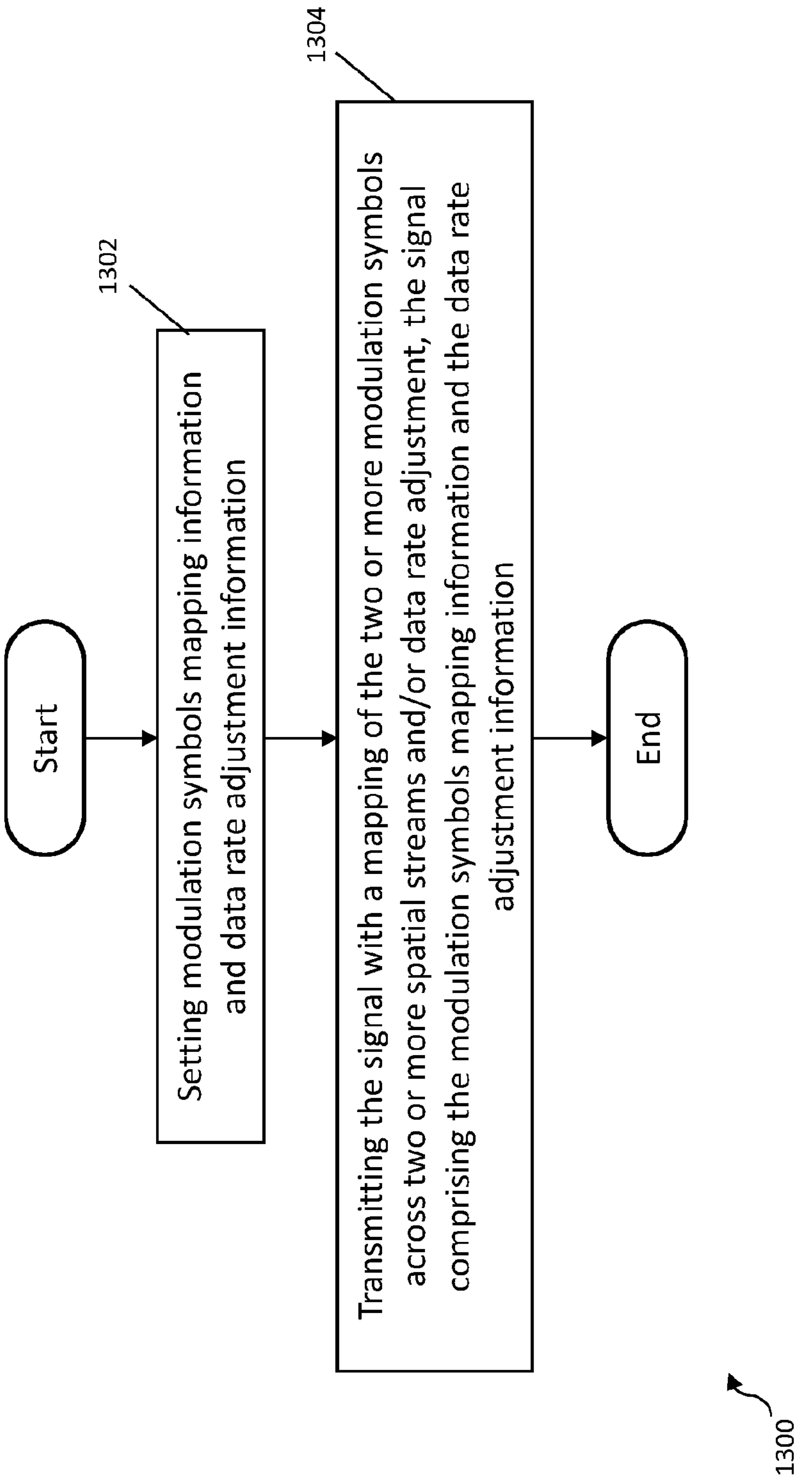
FIG. 13 shows a flowchart illustrating a communication method implemented by a first communication apparatus according to various embodiments of the present disclosure.

FIG. 13 shows a flowchart 1300 illustrating a communication method implemented by a first communication apparatus. The first communication apparatus, for example, may be an AP or a transmitter STA according to various embodiments of the present disclosure. In step 1302, a step of setting first information (modulation symbols mapping information) and second information (data rate adjustment information) is carried out. The first information may indicate whether a mapping of two or more modulation symbols modulated from an information bit of a signal to two or more subcarriers is applied across two or more spatial streams of an OFDM symbol and the second information may indicate whether a data rate adjustment is applied to the signal. In step 1304, a step of transmitting the signal with the mapping of the two or more modulation symbols across the two or more spatial streams and/or the data rate adjustment is carried out, wherein the signal may comprise the first information and the second information.

Figure 14:
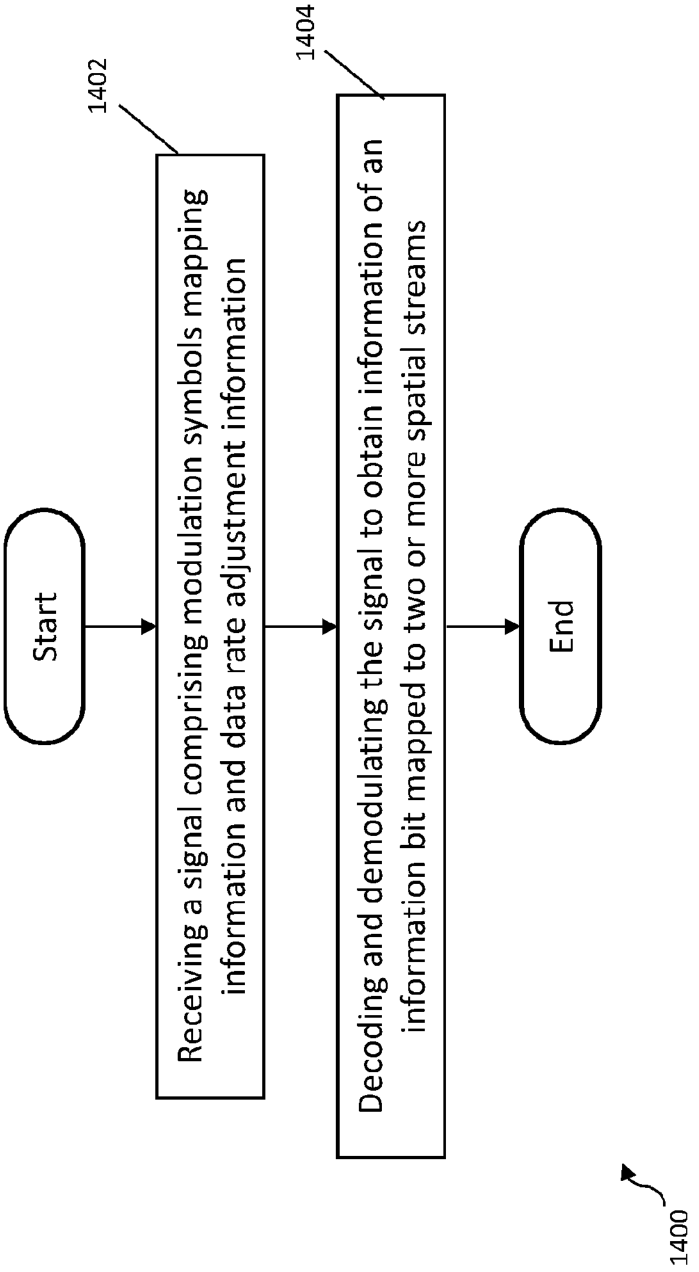
FIG. 14 shows a flowchart illustrating a communication method implemented by a second communication apparatus according to various embodiments of the present disclosure.

FIG. 14 shows a flowchart 1400 illustrating a communication method implemented by a second communication apparatus. The second communication apparatus, for example, may be a receiver STA according to various embodiments of the present disclosure. In step 1402, a step of receiving a signal comprising first information (modulation symbols mapping information) and second information (data rate adjustment information) is carried out, the first information indicating whether a mapping of two or more modulation symbols modulated from an information bit of the signal to two or more subcarriers is applied across two or more spatial streams of an OFDM symbol and the second information indicating whether a data rate adjustment is applied to the signal. In step 1404, a step of decoding and demodulating the signal to obtain information of the information bit mapped to the two or more spatial streams is carried out.

In the following paragraphs, a first embodiment of the present disclosure where an application of an enhanced frequency diversity scheme such as a Space-Frequency Diversity scheme (SFDS) applied to more than one spatial stream (SS) without a reliability improvement method is described.

Figure 15:
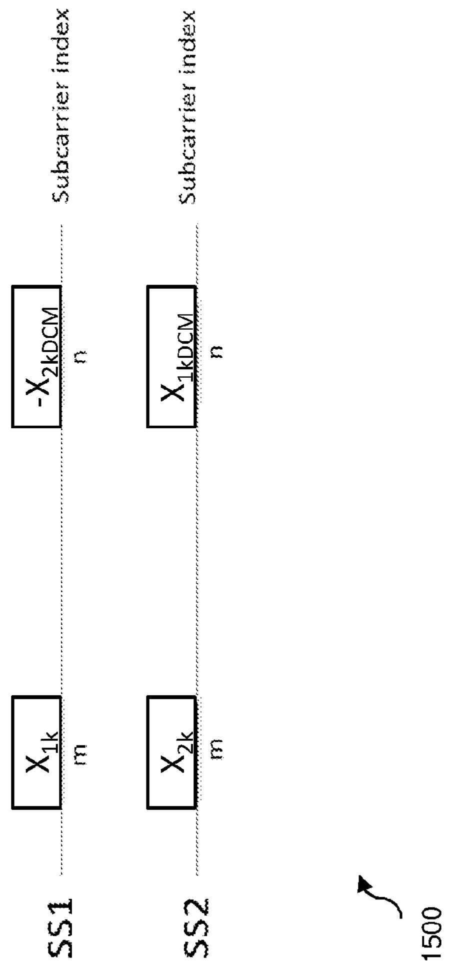
FIG. 15 shows a block diagram illustrating an enhanced frequency diversity scheme applied to two information bits across two spatial streams of an OFDM symbol according to a first embodiment of the present disclosure.

FIG. 15 shows a block diagram 1500 illustrating an enhanced frequency diversity scheme applied to two information bits across two spatial streams (SS1, SS2) of an OFDM symbol according to the first embodiment of the present disclosure. In particular, a SFDS scheme is applied and an information bit from the first spatial stream (SS1) is modulated to two modulation symbols $X_{1k}$, $X_{1kDCM}$ mapped to a pair of subcarriers (m, n). One of the modulation symbols (e.g., $X_{1k}$) is mapped to the first subcarrier (m) corresponding to the first spatial stream (SS1) and the other modulation symbol (e.g., $X_{1kDCM}$) is mapped to the second subcarrier (n) corresponding to the second spatial stream (SS2). Another information bit from a second spatial stream is also modulated to two modulation symbols $X_{2k}$, $X_{2kDCM}$ mapped to the pair of subcarriers (m, n). One of the modulation symbols (e.g., $X_{2k}$) is mapped to the first subcarrier (m) corresponding to the second spatial stream (SS2) and the other modulation symbol e.g., $X_{2kDCM}$) is mapped to the second subcarrier (n) corresponding to the first spatial stream (SS1). The pair of sub-carriers (m, n) are separated far apart in frequency in the spatial stream (e.g., separated by $N_{SD}/2$, where $N_{SD}$ is the number of data subcarriers per OFDM symbol or the number of data subcarriers within the subband (e.g., 20/40/80 MHz subband)).

Preferably, a phase rotation or a sign inversion on a modulation symbol on partial frequency subcarrier from a spatial stream is applied (e.g., second modulated symbol from the other information bit mapped to the second subcarrier (n) corresponding to the first spatial stream is rotated or inverted from $X_{2kDCM}$ to $-X_{2kDCM}$) to differentiate from the counterpart modulation symbol from another spatial stream (e.g., the second modulated symbol from the information bit (e.g., $X_{1kDCM}$) mapped to the same second subcarrier (n) corresponding to the second spatial stream).

Advantageously, such SFDS scheme applied to more than one SS can provide certain spatial diversity gain in certain propagation environments. For example, in flat fading channel/Line of Sight (LOS) small room environment, it is possible that more than one SS performs better because of spatial diversity. In Non-Line of Sight (NLOS) large room environment, spatial diversity effect is probably small because frequency diversity effect is large enough. There may be no spatial diversity gain in AWGN channel with same total power to apply SFDS across more than one SS.

It is noted that the more than one spatial stream transmission shall be sent to a single user. A receiver STA who receives a PPDU with a preamble indicating SFDS is applied across more than one spatial stream shall combine the demodulated symbols from different SSs following the SFDS mapping before decoding the PPDU to obtain the signal and spatial diversity gain.

Figure 16:
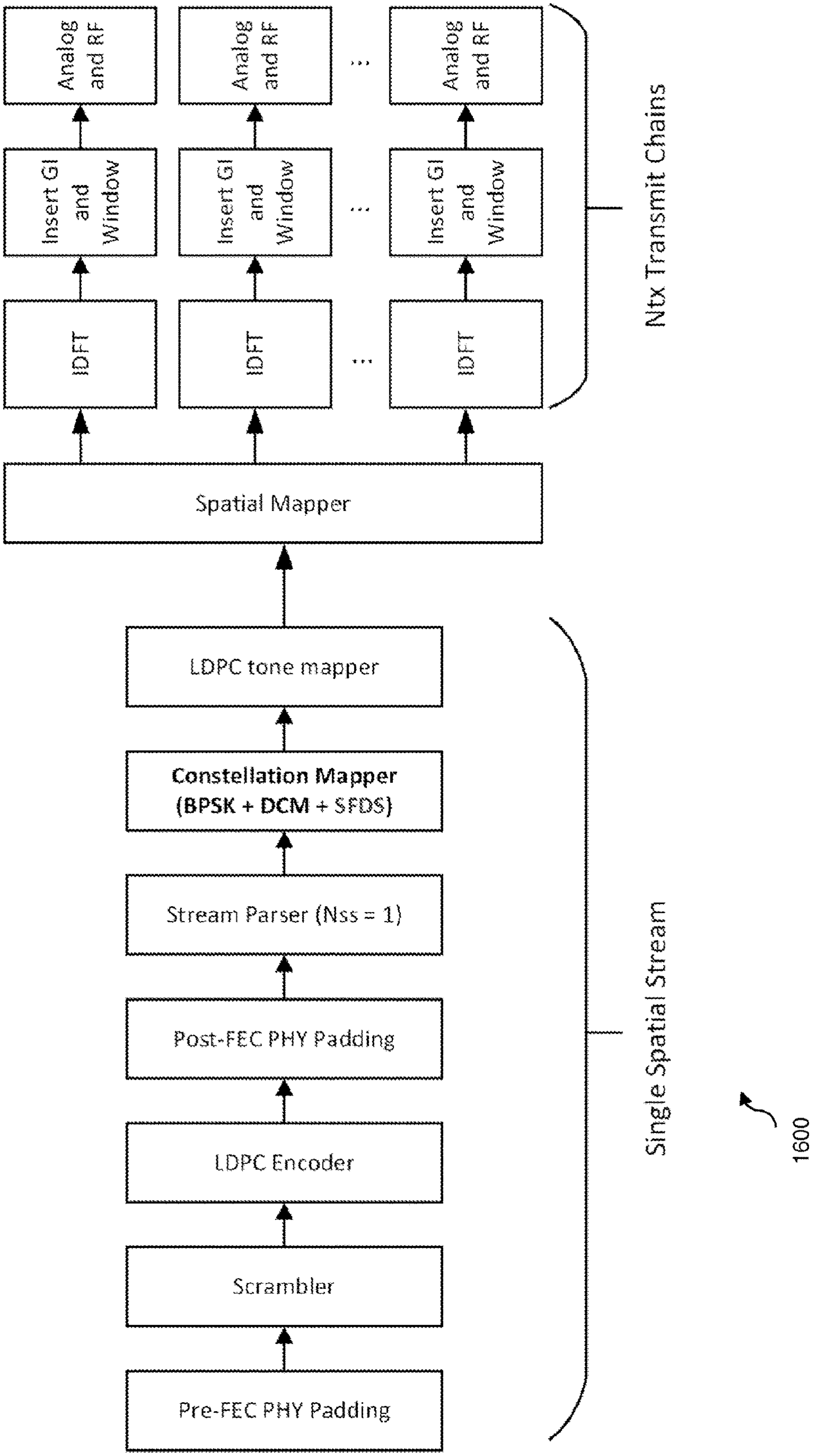
FIG. 16 shows a transmit block diagram illustrating a processing of a data field through an enhanced frequency diversity scheme according to the first embodiment of the present disclosure.

FIG. 16 shows a transmit block diagram 1600 illustrating a processing of a data field through an enhanced frequency diversity scheme according to the first embodiment of the present disclosure. The transmitter processing is similar to that shown in FIG. 5 using a Pre-FEC PHY Padding unit, a Scrambler unit, a LDPC Encoder unit, a Post-FEC PHY Padding unit, a Stream Parser unit ($N_{SS}$=1), a Constellation Mapper unit and a LDPC Tone Mapper unit to process a single spatial stream. Specifically, in this first embodiment, the Constellation Mapper unit maps respective blocks of the encoded bits to modulation symbols using BPSK, DCM and SFDS schemes and maps each modulation symbol to two OFDM subcarriers before the symbols are sent to the LDPC Tone Mapper unit and to a Spatial Mapper unit to map the spatial stream onto one or more than one transmit chain (each indicated by an arrow pointing out from the Spatial Mapper unit).

In the following paragraphs, a second embodiment of the present disclosure where an application of an enhanced frequency diversity scheme such as a Dual Carrier Modulation (DCM) is applied to more than one spatial stream (SS) without a reliability improvement method is described. In contrast to conventional DCM scheme, the DCM according to this embodiment, same information bits and modulation symbols are duplicated to more than one SS, i.e., spatial duplication, with Cyclic Shift Diversity (CSD) applied.

According to the second embodiment, when an application of an enhanced frequency diversity scheme is indicated, two different options/examples of spatial duplication can be applied: (1) normal spatial duplication without CSD applied; and (2) spatial duplication with CSD such as partial phase rotation or sign invention applied.

Figure 17:
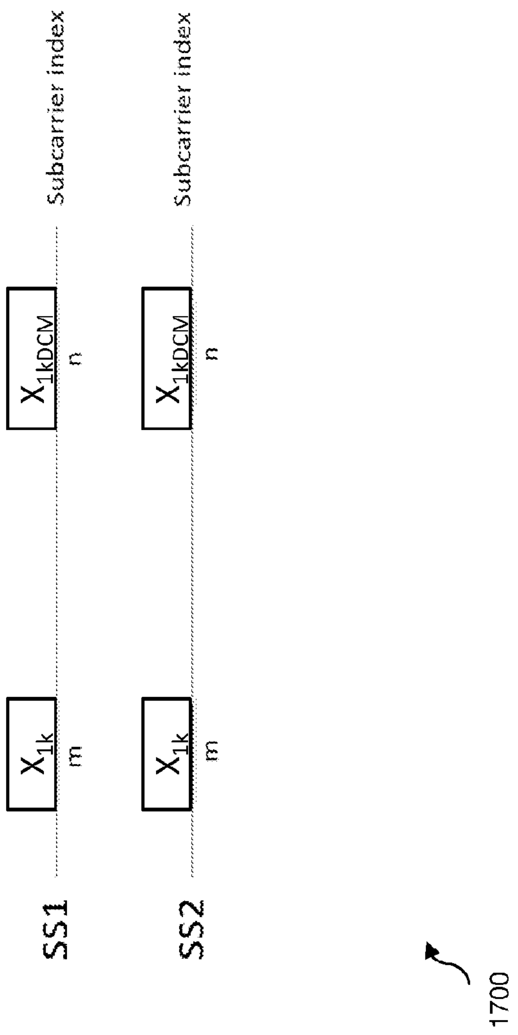
FIG. 17 shows a block diagram illustrating an enhanced frequency diversity scheme with a spatial duplication option applied to an information bit across every spatial stream of an OFDM symbol according to a second embodiment of the present disclosure.
Figure 18:
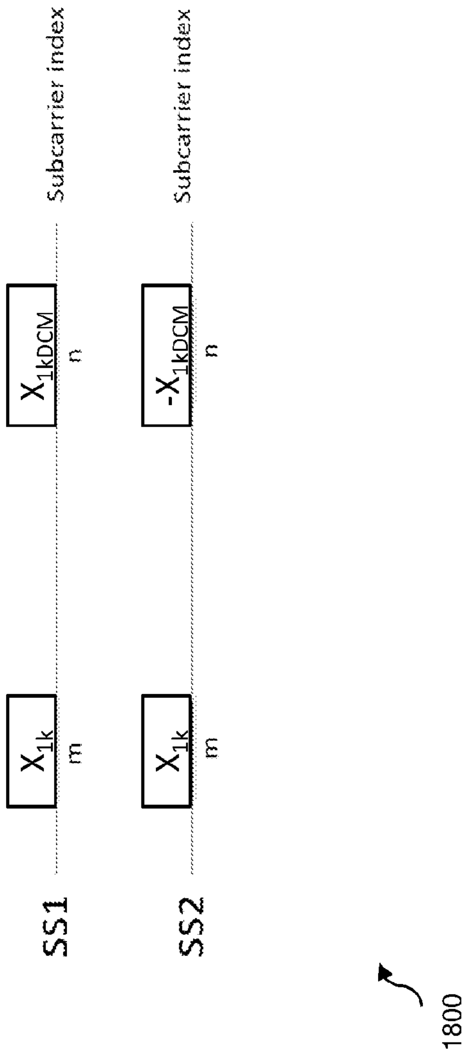
FIG. 18 shows a block diagram illustrating an enhanced frequency diversity scheme with another spatial duplication option applied to an information bit across every spatial stream of an OFDM symbol according to the second embodiment of the present disclosure.

FIG. 17 shows a block diagram 1700 illustrating an enhanced frequency diversity scheme with a spatial duplication under Option 1 applied to an information bit across every spatial stream of an OFDM symbol according to the second embodiment of the present disclosure. FIG. 18 shows a block diagram 1800 illustrating an enhanced frequency diversity scheme with a spatial duplication under Option 2 applied to an information bit across every spatial stream of an OFDM symbol according to the second embodiment of the present disclosure.

Referring to FIG. 17, in the enhanced frequency diversity scheme under Option 1 according to the second embodiment, a DCM scheme with a normal spatial duplication is applied to more than one spatial stream. In particular, an information bit is modulated to two modulation symbols $X_{1k}$, $X_{1kDCM}$ mapped to a pair of subcarriers (m, n) corresponding to a first spatial stream (SS1). The same modulation symbols $X_{1k}$, $X_{1kDCM}$ as well as their subcarrier (m, n) mapping are also duplicated to the second spatial stream (SS2). The pair of sub-carriers (m, n) are separated far apart in frequency in the spatial stream (e.g., separated by $N_{SD}/2$ where $N_{SD}$ is the number of data subcarriers per OFDM symbol or the number of data subcarriers within the subband (e.g., 20/40/80 MHz subband)).

Referring to FIG. 18, in the enhanced frequency diversity scheme under Option 2 according to the second embodiment, a DCM scheme with a spatial duplication and a CSD is applied to more than one spatial stream. In particular, an information bit is modulated to two modulation symbols $X_{1k}$, $X_{1kDCM}$ mapped to a pair of subcarriers (m, n) corresponding to a first spatial stream (SS1). The same modulation symbols $X_{1k}$, $X_{1kDCM}$ as well as their subcarrier (m, n) mapping are also duplicated to the second spatial stream (SS2). In contrast to Option 1, a phase rotation or a sign inversion on a modulation symbol on partial frequency subcarrier from a spatial stream is applied (e.g., second modulated symbol mapped to the second subcarrier (n) corresponding to the second spatial stream is rotated or inverted from $X_{1kDCM}$ to $-X_{1kDCM}$) to differentiate from the same modulation symbol from another spatial stream (e.g., the modulated symbol $X_{1kDCM}$ mapped to the second subcarrier (n) corresponding to the first spatial stream). As such, a lower peak to average power ratio (PAPR) and higher robustness can be obtained.

Under this scheme, a receiver STA who receives a PPDU with preamble indicating DCM is applied across more than one spatial stream with spatial duplication with/without rotation (Option 1 or 2) shall combine demodulated symbols from different SSs following the mapping before decoding the PPDU to get the spatial diversity and robustness gain.

Advantageously, such DCM scheme with spatial duplication applied to more than one SS can provide spatial diversity gain despite it has the same data rate and performance as DCM with single SS or transmission of single SS with 2 transmitter antennas.

Figure 19:
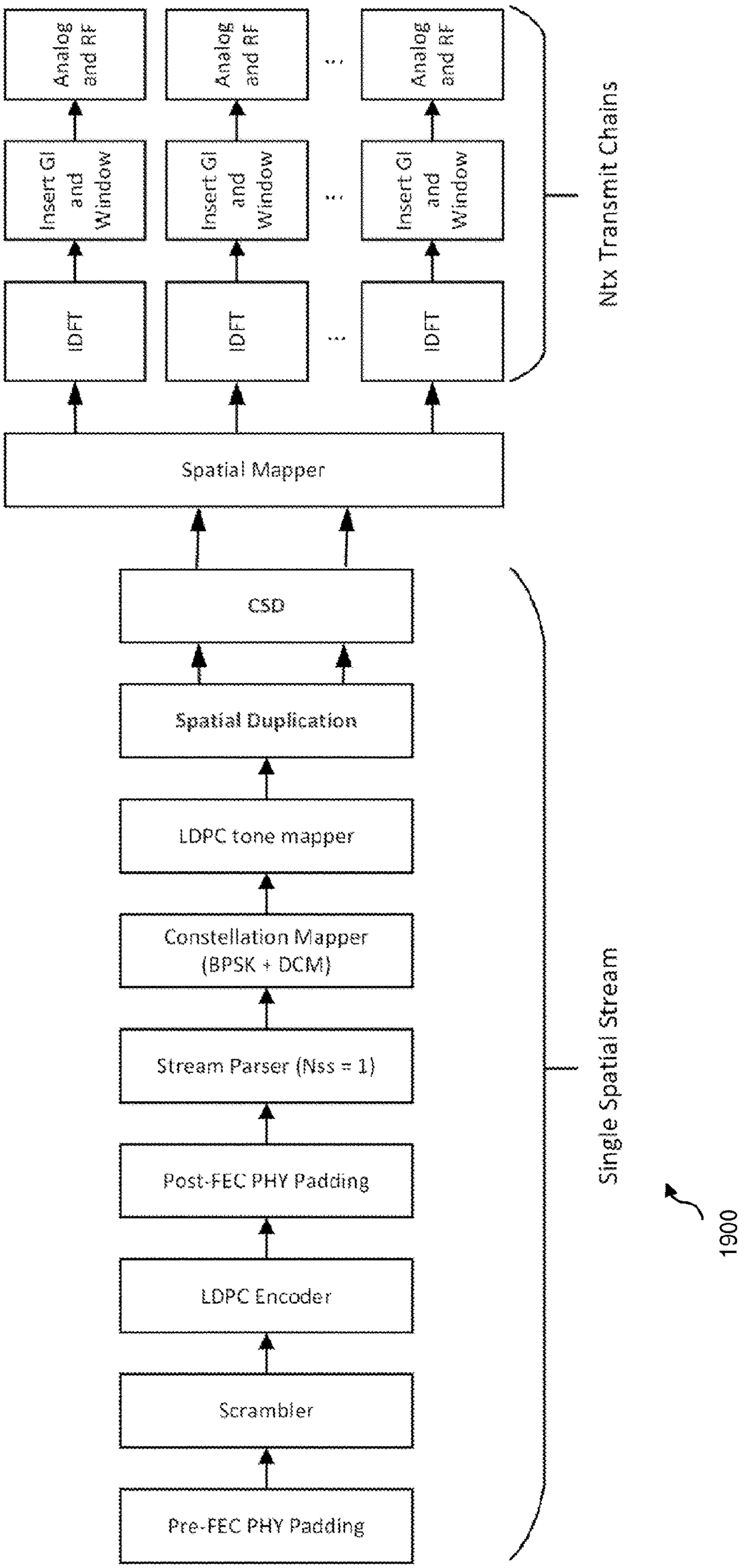
FIG. 19 shows a transmit block diagram illustrating a processing of a data field through an enhanced frequency diversity according to the second embodiment of the present disclosure.

FIG. 19 shows a transmit block diagram 1900 illustrating a processing of a data field through an enhanced frequency diversity according to the second embodiment of the present disclosure. The transmitter processing is similar to that shown in FIG. 5 using a Pre-FEC PHY Padding unit, a Scrambler unit, a LDPC Encoder unit, a Post-FEC PHY Padding, a Stream Parser unit ($N_{SS}$=1), a Constellation Mapper unit and a LDPC Tone Mapper unit to process a single spatial stream. Specifically, in this second embodiment, after the LDPC Tone Mapper unit, the spatial stream is sent to a Spatial Duplication unit where the modulated symbols on the spatial stream are duplicated to two spatial streams (each indicated by an arrow pointing out from the Spatial Duplication unit). The spatial stream and the duplicated spatial stream(s) are then sent to the Spatial Mapper unit to map onto two or more than two transmit chains. Optionally, under Option 2, one spatial stream(s) from the multiple spatial streams from the Spatial Duplication unit is sent to a CSD unit to perform a phase rotation or sign inversion on its modulated symbols before the spatial stream is sent to the Spatial Mapper unit to map onto three transmit chains.

In the following paragraphs, a third embodiment of the present disclosure where an application of an enhanced frequency diversity scheme such as a Dual Carrier Modulation (DCM) is applied to more than one spatial stream (SS) without a reliability improvement method is described. In contrast to conventional DCM scheme, the DCM according to this embodiment, same information bit is modulated to two or more modulation symbols using different modulation mapping (e.g., two DCM schemes) and the modulated symbols are permuted among different SSs. The permutation is carried out on frequency subcarriers of the OFDM symbol.

According to the third embodiment, when an application of an enhanced frequency diversity scheme is indicated, two different options/examples of frequency subcarrier permutation can be applied: (1) permutation is carried out among subcarrier blocks of the symbol; and (2) permutation is carried out between adjacent two or more subcarriers of the symbol.

Figure 20:
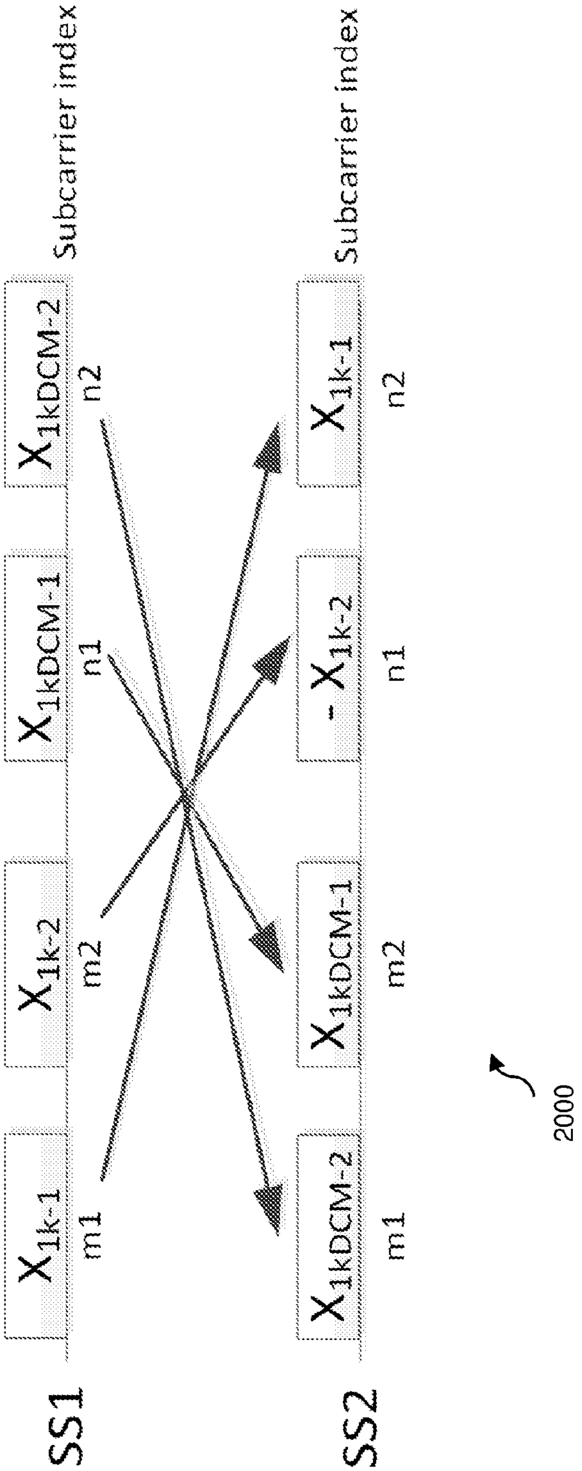
FIG. 20 shows a block diagram illustrating an enhanced frequency scheme and a permutation option applied to an information bit across every spatial stream of an OFDM symbol according to a third embodiment of the present disclosure.
Figure 21:
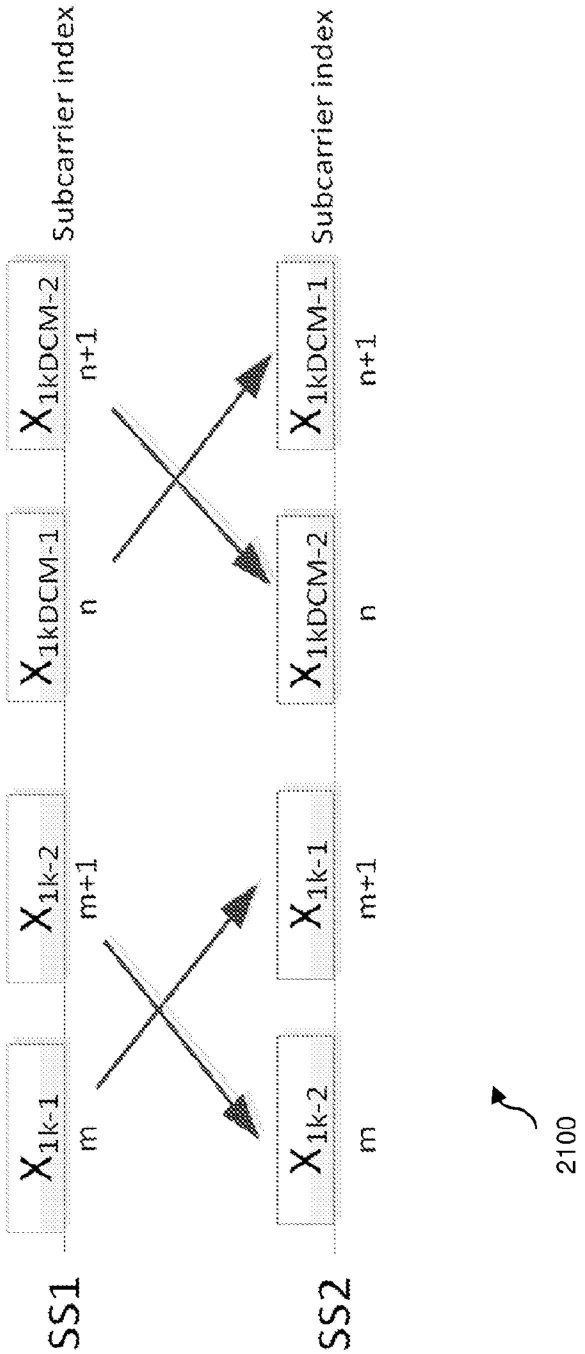
FIG. 21 shows a block diagram illustrating an enhanced frequency diversity scheme and another permutation option applied to an information bit across every spatial stream of an OFDM symbol according to the third embodiment of the present disclosure.

FIG. 20 shows a block diagram 2000 illustrating an enhanced frequency scheme and a permutation under Option 1 applied to an information bit across every spatial stream of an OFDM symbol according to the third embodiment of the present disclosure. FIG. 21 shows a block diagram 2100 illustrating an enhanced frequency diversity scheme and a permutation under Option 2 applied to an information bit across every spatial stream of an OFDM symbol according to the third embodiment of the present disclosure.

In the enhanced frequency diversity scheme according to the third embodiment, an information bit $X_1$ is modulated using two different modulation mappings, each modulation mapping generating a pair of modulation symbols, on a spatial stream (e.g., first spatial steam SS1). In particular, a first modulation mapping generates modulation symbols $X_{1k\text{-}1}$ and $X_{1kDCM\text{-}1}$ mapped to subcarriers m1 and n1, respectively, corresponding to the first spatial steam SS1; and a second modulation mapping generates modulation symbols $X_{1k\text{-}2}$ and $X_{1kDCM\text{-}2}$ mapped to subcarriers m2 and n2, respectively, corresponding to the same SS1. The modulation symbols are then permuted and mapped to another SS (e.g., SS2).

Referring to FIG. 20, under Option 1, a permutation is carried out among all four subcarrier blocks of the symbol $X_{1k\text{-}1}$, $X_{1kDCM\text{-}1}$, $X_{1k\text{-}2}$ and $X_{1kDCM\text{-}2}$ on m1, m2, n1 and n2, respectively, is applied. In particular, the mapping sequence of the subcarrier blocks of the symbol in the first spatial stream (SS1) is permuted and reversed in the second spatial stream (SS2). The first symbol ($X_{1k\text{-}1}$) mapped to the first subcarrier index m1 in SS1 is permuted to the fourth subcarrier index n2 in SS2; the second symbol ($X_{1kDCM\text{-}1}$) mapped to the second subcarrier index m2 in SS1 is permuted to the third subcarrier index n1 in SS2; the third symbol ($X_{1k\text{-}2}$) mapped to the third subcarrier index n1 in SS1 is permuted to the second subcarrier index m2 in SS2; the fourth symbol ($X_{1kDCM\text{-}2}$) mapped to the fourth subcarrier index n2 in SS1 is permuted to the first subcarrier index m1 in SS2.

Referring to FIG. 21, under Option 2, a permutation is carried out between adjacent two subcarriers of the symbol. In particular, two adjacent subcarriers of the symbol are grouped (e.g., $X_{1k\text{-}1}$ and $X_{1kDCM\text{-}1}$; $X_{1k\text{-}2}$ and $X_{1kDCM\text{-}2}$), and the mapping sequence of the two adjacent subcarriers of the symbol in the first spatial stream (SS1) is permuted and reversed in the second spatial stream (SS2). The first symbol ($X_{1k\text{-}1}$) mapped to the first subcarrier index m in SS1 is permuted to the second subcarrier index m+1 in SS2; the second symbol ($X_{1kDCM\text{-}1}$) mapped to the second subcarrier index n in SS1 is permuted to the first subcarrier index n+1 in SS2; the third symbol ($X_{1k\text{-}2}$) mapped to the third subcarrier index m+1 in SS1 is permuted to the fourth subcarrier index m in SS2; the fourth symbol ($X_{1kDCM\text{-}2}$) mapped to the fourth subcarrier index n+1 in SS1 is permuted to the third subcarrier index n in SS2.

Such permutation among spatial streams can be applied on top of any enhanced frequency diversity scheme described across various embodiments in the present disclosure to further obtain robustness and frequency diversity according to the embodiment. For example, as shown in FIG. 20, a phase rotation or a sign inversion on a modulation symbol on partial frequency subcarrier from a spatial stream can be applied (e.g., second modulated symbol mapped to the third subcarrier (n1) corresponding to the second spatial stream is rotated or inverted from $X_{1k-2}$ to $-X_{1k-2}$) to differentiate from the counterpart modulation symbol from another spatial stream.

It is noted that the more than one spatial stream transmission shall be sent to a single user. Under this scheme, either under Option 1 or 2 according to this third embodiment, a receiver STA who receives a PPDU with a preamble indicating permutation among spatial streams is applied across more than one spatial stream with/without partial rotation, shall combine the demodulated symbols from different SSs following the mapping before decoding the PPDU to get the spatial diversity and robustness gain.

Advantageously, such DCM scheme with spatial duplication applied to more than one SS can provide spatial diversity gain and further frequency diversity gain with a same data rate as DCM with single SS, as well as better robustness as one information bit can also be carried in 2N subcarriers on N SSs.

Figure 22:
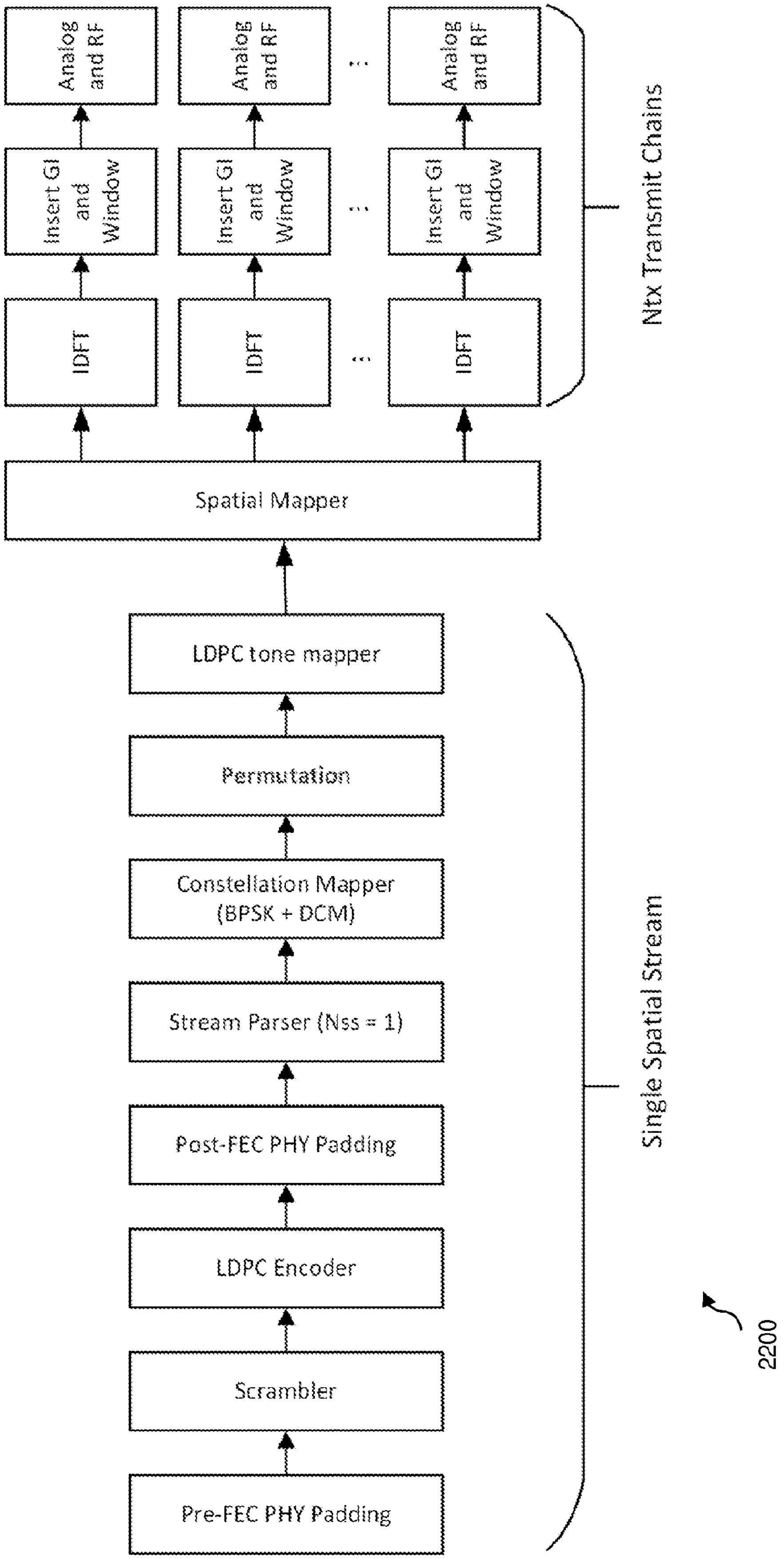
FIG. 22 shows a transmit block diagram illustrating a processing of a data field through an enhanced frequency diversity scheme according to the third embodiment of the present disclosure.

FIG. 22 shows a transmit block diagram 2200 illustrating a processing of a data field through an enhanced frequency diversity scheme according to the third embodiment of the present disclosure. The transmitter processing is similar to that shown in FIG. 5 using a Pre-FEC PHY Padding unit, a Scrambler unit, a LDPC Encoder unit, a Post-FEC PHY Padding unit, a Stream Parser unit ($N_{SS}$=1), a Constellation Mapper unit and a LDPC Tone Mapper unit to process a single spatial stream to process a single spatial stream. Specifically, in this third embodiment, after the Constellation Mapper unit maps respective blocks of the encoded bits to modulation symbols using BPSK, DCM schemes, the modulation symbols are sent to a Permutation unit to perform a permutation of the frequency subcarriers in a spatial stream(s), and maps each modulation symbol to two OFDM subcarriers before the symbols mapped to the spatial stream are sent to the LDPC Tone Mapper unit and to a Spatial Mapper unit to map the spatial stream onto one or more than one transmit chain.

In the following paragraphs, a fourth embodiment of the present disclosure where an application of an enhanced frequency diversity scheme such as a Dual Carrier Modulation (DCM) is applied to space-time streams (STSs) generated by Space-time Block Coding (STBC) scheme from one or more SSs without a reliability improvement method is described.

STBC is a robust transmission technique for OFDM symbol where same information bits from a SS are further mapped into more than one STS, or in other words, n SS(s) is mapped to 2n STSs. The STBC operation shall occur between the constellation mapper and the spatial mapper. In particular, a STBC processing operates on the complex modulation symbols in sequential pairs of OFDM symbols.

Figure 23:
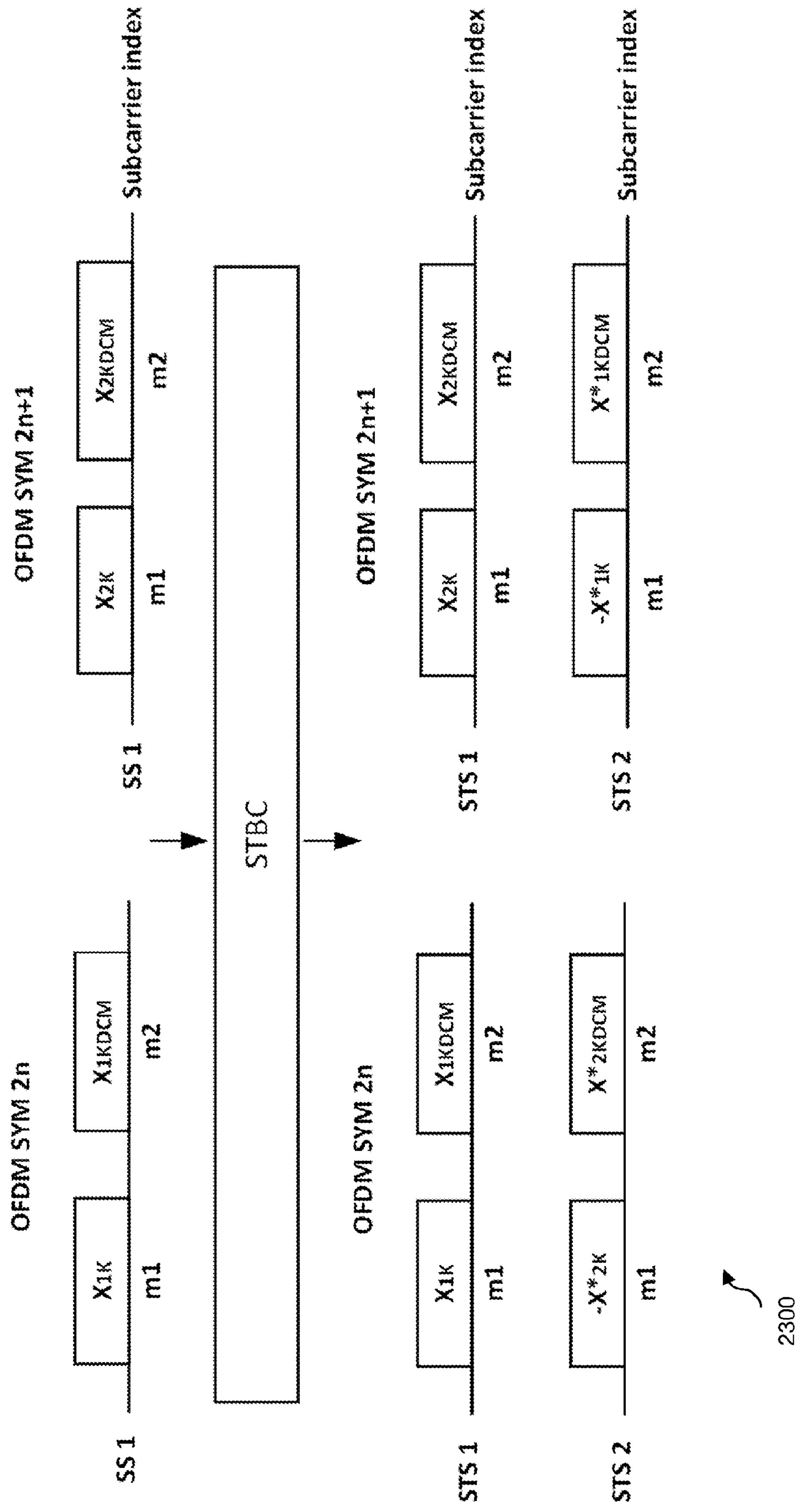
FIG. 23 shows a block diagram illustrating an enhanced frequency diversity scheme applied to two information bits from a spatial stream of two OFDM symbols to generate space-time streams (STSs) using Space-time Block Coding (STBC) according to a fourth embodiment of the present disclosure.

FIG. 23 shows a block diagram 2300 illustrating an enhanced frequency diversity scheme applied to two information bits from a spatial stream of two OFDM symbols to generate STSs using STBC according to the fourth embodiment of the present disclosure.

An information bit $X_1$ from a spatial stream (e.g., first spatial steam SS1) is modulated using DCM scheme to a pair of modulation symbols $X_{1k}$ and $X_{1kDCM}$ on a OFDM symbol 2n; while a second information bit $X_2$ from the spatial stream SS1 is also modulated using DCM scheme to a pair of modulation symbols $X_{2k}$ and $X_{2kDCM}$ on an adjacent OFDM symbol 2n+1.

In the enhanced frequency diversity scheme according to the fourth embodiment, the modulation symbols from a SS (SS1) are processed through a STBC unit and mapped to two STSs (STS1 and STS2), each STS containing the same modulation symbols. As shown in FIG. 23, the two STSs may be from different OFDM symbols. In particular, the modulation symbols $X_{1k}$, $X_{1kDCM}$ from SS1 of OFDM symbol 2n are mapped to $X_{1k}$, $X_{1kDCM}$ in STS1 of OFDM symbol 2n and $-X^*_{1k}$, $-X^*_{1kDCM}$ in STS2 of adjacent OFDM symbol 2n+1 whereas the modulation symbols $X_{2k}$, $X_{2kDCM}$ from SS1 of OFDM symbol 2n+1 are mapped to $X_{2k}$, $X_{2kDCM}$ in STS1 of OFDM symbol 2n+1 and $-X^*_{2k}$, $X^*_{2kDCM}$ in STS2 of adjacent OFDM symbol 2n. In this example, a phase rotation or sign inversion is applied to a modulation symbol from a OFDM symbol mapped to a STS of an adjacent symbol (e.g., $X^*_{1k}$, $X^*_{2k}$) to differentiate from the counterpart modulation symbol from another STS.

Advantageously, such DCM scheme and STBC scheme applied to more than one SS to generate two STSs from each SS can provide a spatial diversity gain and better robustness with a same data rate as DCM with single SS.

Alternatively, different from the above DCM scheme with one SS, the STBC scheme can be applied to DCM with more than one SS. In such case, there would be more than two STSs, and require more antennas and EHT-LTF symbols for transmission.

Such DCM scheme among STSs generated by a STBC scheme can be applied on top of any enhanced frequency diversity scheme described across various embodiments in the present disclosure to further obtain robustness and frequency diversity according to the embodiment. For example, as shown in FIG. 23, a phase rotation or a sign inversion is applied to a modulation symbol from a OFDM symbol mapped to a STS of an adjacent symbol (e.g., $X^*_{1k}$, $X^*_{2k}$).

Figure 24:
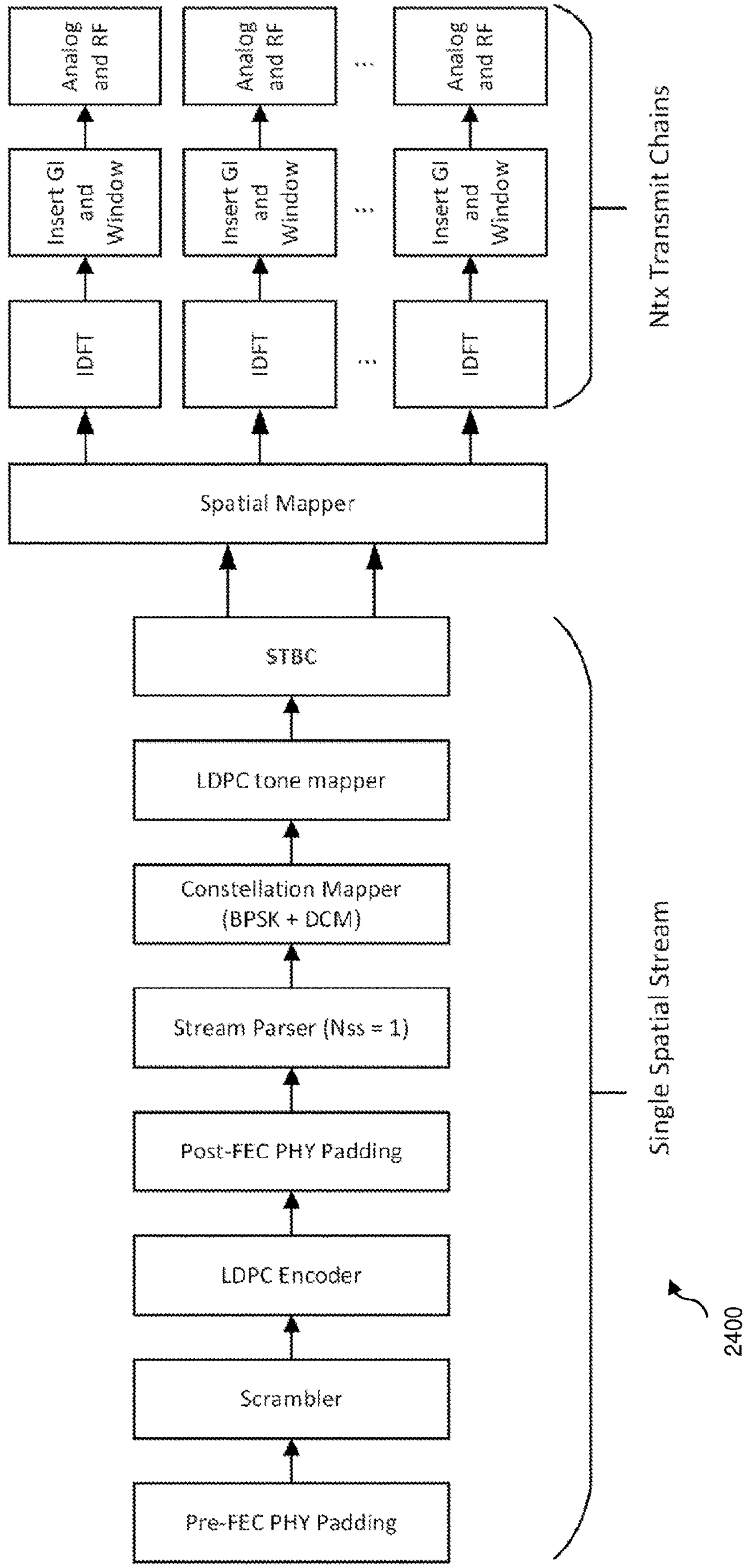
FIG. 24 shows a transmit block diagram illustrating a processing of a data field through an enhanced frequency diversity scheme according to the fourth embodiment of the present disclosure.

FIG. 24 shows a transmit block diagram 2400 illustrating a processing of a data field through an enhanced frequency diversity scheme according to the fourth embodiment of the present disclosure. The transmitter processing is similar to that shown in FIG. 5 using a Pre-FEC PHY Padding unit, a Scrambler unit, a LDPC Encoder unit, a Post-FEC PHY Padding unit, a Stream Parser unit ($N_{SS}$=1), a Constellation Mapper unit and a LDPC Tone Mapper unit to process a single spatial stream to process a single spatial stream. Specifically, in this fourth embodiment, after the LDPC tone mapper unit, the spatial stream is sent to a STBC unit to generate two space-time streams (each indicated by an arrow pointing out from the STBC unit) and the two space-time streams are sent to a Spatial Mapper unit to map onto two or more than two transmit chains.

In the following paragraphs, a fifth embodiment of the present disclosure where an application of an enhanced frequency diversity scheme such as a Quad sub-Carrier Modulation (QCM) to more than one SS without a reliability improvement method is described.

Figure 25:
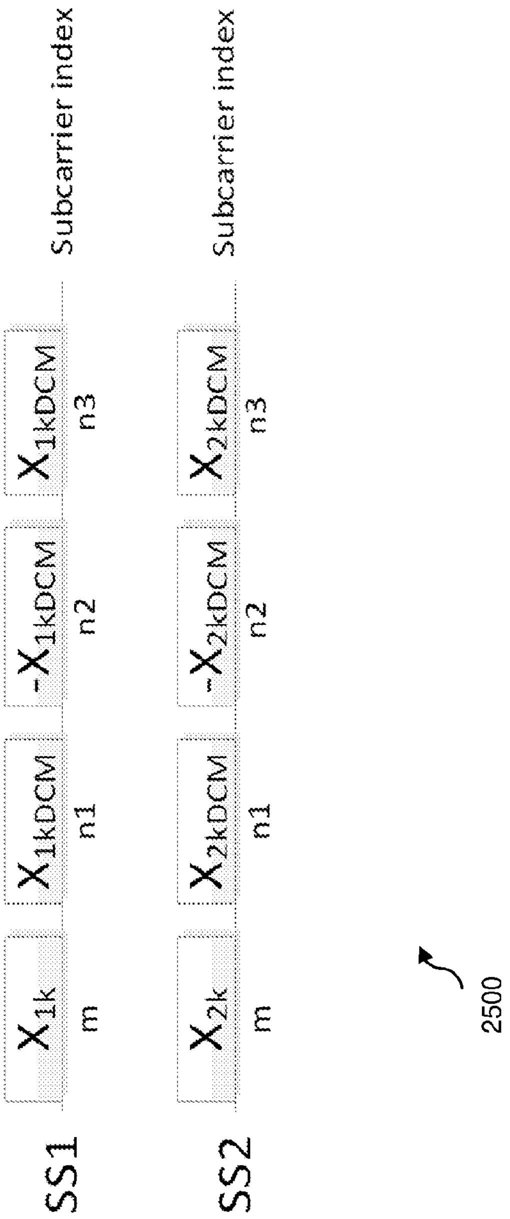
FIG. 25 shows a block diagram illustrating an enhanced frequency diversity scheme applied to two information bits across two spatial streams of an OFDM symbol according to a fifth embodiment of the present disclosure.

FIG. 25 shows a block diagram 2500 illustrating an enhanced frequency diversity scheme applied to two information bits across two spatial streams (SS1, SS2) of an OFDM symbol according to the fifth embodiment of the present disclosure.

In the enhanced frequency diversity scheme according to the fifth embodiment, a QCM scheme is applied to more than one SS. In particular, an information bit from the first spatial stream (SS1) is modulated to four modulation symbols $X_{1k}$, $X_{1kDCM}$, $-X_{1kDCM}$, $X_{1kDCM}$ mapped to four subcarriers (m, n1, n2, n3). Another information bit from a second spatial stream (SS2) is also modulated to four modulation symbols $X_{2k}$, $X_{2kDCM}$, $-X_{2kDCM}$, $X_{2kDCM}$ mapped to the same four subcarriers (m, n1, n2, n3). The subcarriers (m, n1, n2, n3) are separated far apart in frequency in the spatial stream (e.g., separated by $N_{SD}/4$ where $N_{SD}$ is the number of data subcarriers per OFDM symbol or the number of data subcarriers within the subband (e.g., 20/40/80 MHz subband)).

Advantageously, such QCM scheme applied to more than one SS can provide spatial and frequency diversity with a same data rate as DCM with single SS. However, it may not be applied to 26-tone resource unit (RU) as the RU tone size cannot be divided into four equal units. Under such scheme, different spatial streams may also be sent to different users, respectively. Such QCM scheme can also be integrated with any enhanced frequency diversity scheme described across various embodiments in the present disclosure to further obtain robustness and frequency diversity according to the embodiment.

Figure 26:
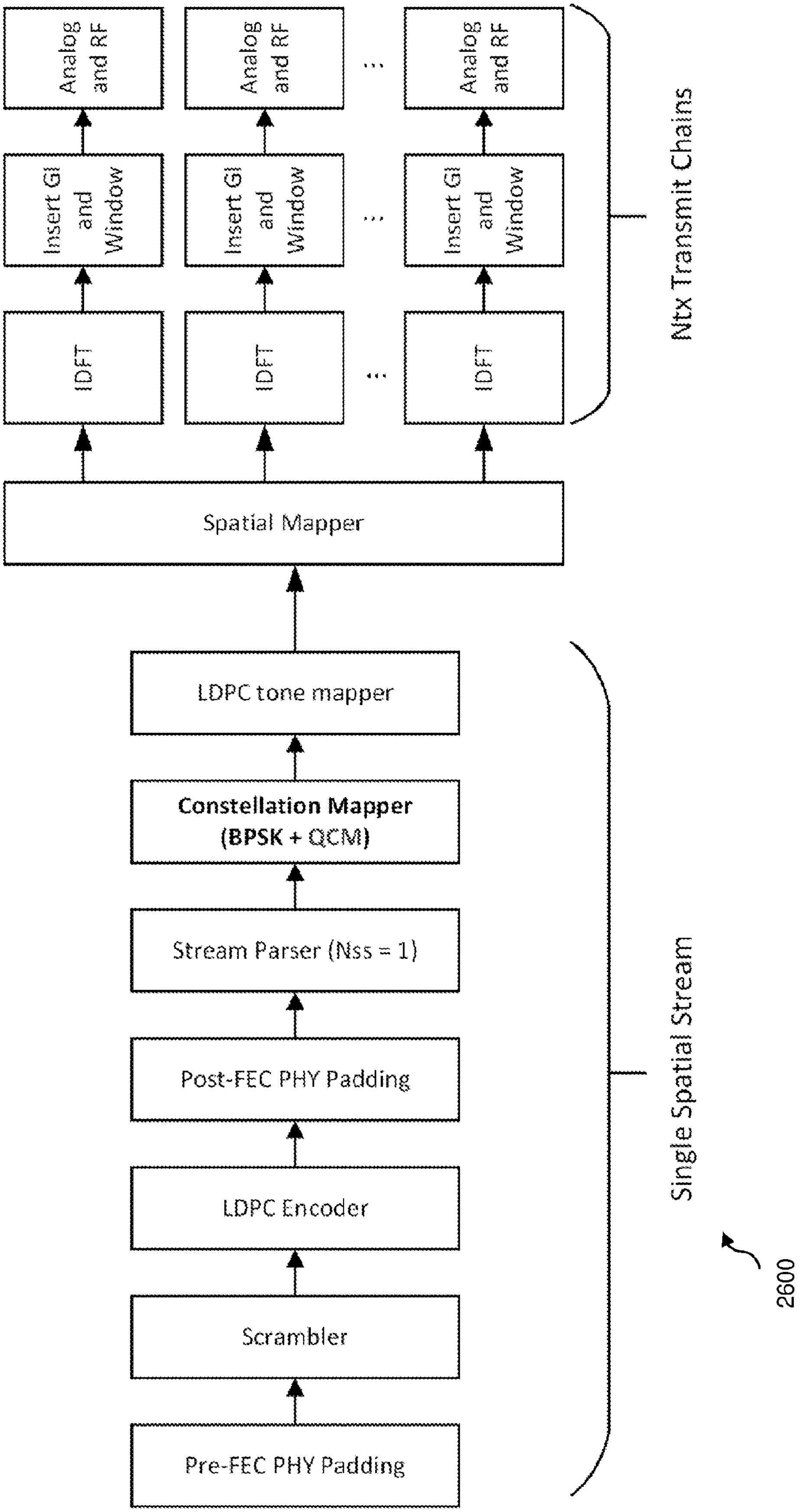
FIG. 26 shows a transmit block diagram illustrating a processing of a data field through an enhanced frequency diversity scheme according to the fifth embodiment of the present disclosure.

FIG. 26 shows a transmit block diagram 2600 illustrating a processing of a data field through an enhanced frequency diversity scheme according to the fifth embodiment of the present disclosure. The transmitter processing is similar to that shown in FIG. 5 using a Pre-FEC PHY Padding unit, a Scrambler unit, a LDPC Encoder unit, a Post-FEC PHY Padding unit, a Stream Parser unit ($N_{SS}$=1), a Constellation Mapper unit and a LDPC Tone Mapper unit to process a single spatial stream to process a single spatial stream. Specifically, in this fifth embodiment, the Constellation Mapper unit maps respective blocks of the encoded bits to four modulation symbols using BPSK and QCM schemes and maps each modulation symbol to four OFDM subcarriers before the spatial stream is sent to the LDPC Tone Mapper unit and to a Spatial Mapper unit to map the spatial stream onto three transmit chains.

In the following paragraphs, a sixth embodiment of the present disclosure where an application of an enhanced frequency diversity scheme, for example an enhanced frequency diversity scheme description in the first to fifth embodiments above, with a reliability improvement method is described.

In particular, the time-domain based repetition reliability improvement method is described in this embodiment, and three different options/examples of time-domain based repetition can be applied: (1) direct time repetition where each OFDM symbol in the payload portion of a PPDU is duplicated one or more times before the next OFDM symbol; (2) OFDM symbol repetition with subcarrier permutation where each OFDM symbol in the payload portion of a PPDU is duplicated one or more times before the next OFDM symbol, and the subcarriers of the duplicated symbol are permuted; and (3) OFDM symbol repetition with sub-Carriers-time Block Coding scheme (CTBC) where two or more OFDM symbol are grouped into a OFDM symbol block and each OFDM symbol block in the payload portion of a PPDU is duplicated one or more times before the next OFDM symbol block.

Figure 27:
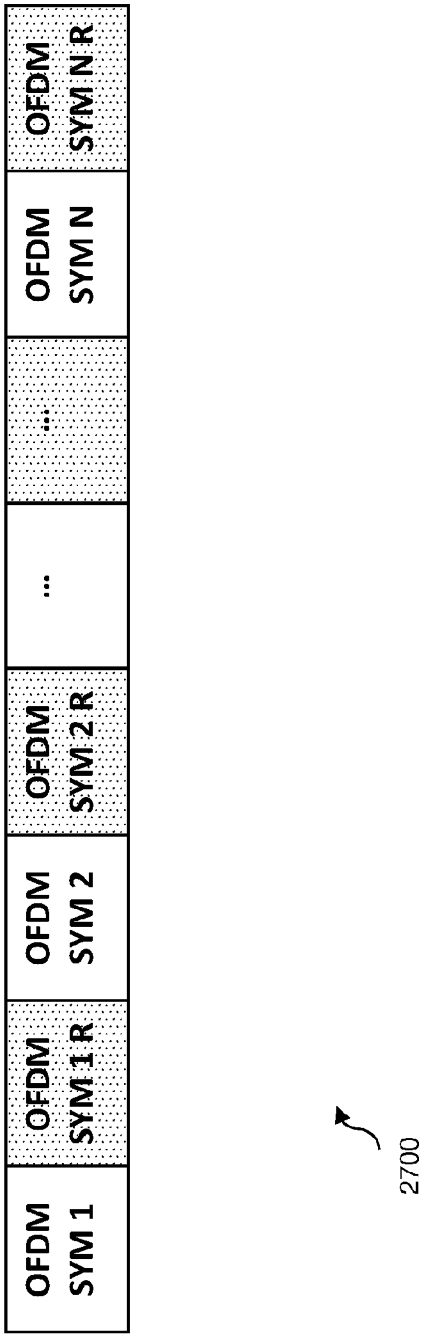
FIG. 27 shows an example payload portion of a PPDU where a time-domain based repetition option is applied according to a sixth embodiment of the present disclosure.
Figure 28:
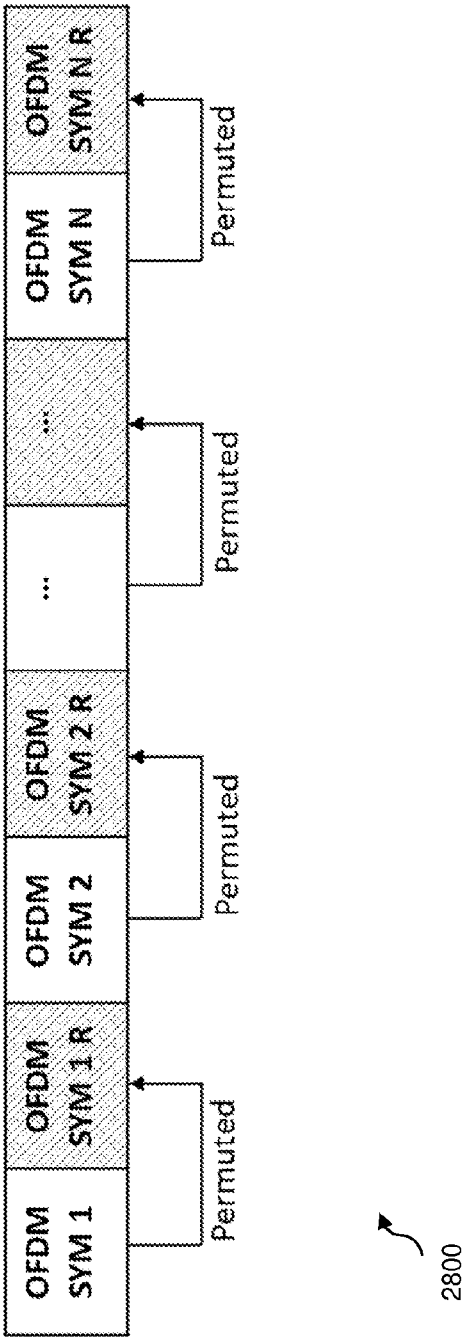
FIG. 28 shows an example payload portion of a PPDU where another time-domain based repetition option is applied according to the sixth embodiment of the present disclosure.

FIG. 27 shows an example payload portion 2700 of a PPDU where a time-domain based repetition reliability improvement method under Option 1 is applied according to the sixth embodiment of the present disclosure. FIG. 28 shows an example payload portion 2800 of a PPDU where a time-domain based repetition reliability improvement method under Option 2 is applied according to the sixth embodiment of the present disclosure. A number of repetitions of 2 (N=2) is illustrated in FIGS. 27 and 28.

The payload portion 2700, 2800 of the PPDU may comprise multiple OFDM symbols (OFDM SYM 1, 2, . . . , N). When a time-domain based repetition reliability improvement method under Option 1 is applied, each OFDM symbol (OFDM SYM 1, 2, . . . , N) within the payload portion 2700 is duplicated once (N=2) such that there are two of the same OFDM SYM before the next OFDM SYM along the payload portion. The duplicated OFDM symbol (OFDM SYM R 1, 2, . . . , N) is allocated immediately after the original OFDM symbol prior to the next OFDM symbol. This will result in a reduction and adjustment of data rate to 1/N, thereby improving the reliability of the transmission but only power gain is obtained because the channel state for adjacent OFDM symbols is quite similar.

When a time-domain based repetition reliability improvement method under Option 2 is applied, on top of the duplication of the OFDM symbol (OFDM SYM 1, 2, . . . , N) within the payload portion described in Option 1, the duplicated OFDM symbol (OFDM SYM X R, where X=1, 2, . . . , N) has its subcarrier permuted. This will result not only in a reduction and adjustment of data rate to 1/N, thereby improving the reliability of the transmission, but also provide power and diversity gain as compared to Option 1.

Figure 29:
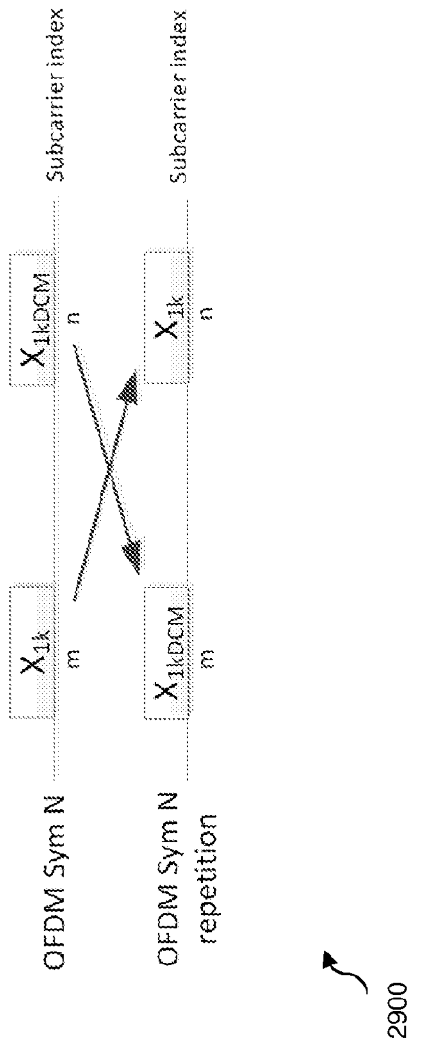
FIG. 29 shows a block diagram illustrating the other time-domain based repetition option applied an OFDM symbol within a payload portion of a PPDU according to the sixth embodiment of the present disclosure.

FIG. 29 shows a block diagram 2900 illustrating a reliability improvement method under Option 2 applied an OFDM symbol (e.g., OFDM SYM N) within a payload portion of a PPDU according to the sixth embodiment of the present disclosure. An information bit is modulated to two modulated symbols $X_{1k}$, $X_{1kDCM}$ mapped to two subcarriers (m, n) in a spatial stream of the OFDM SYM N, respectively. When the reliability improvement method under Option 2 according to the sixth embodiment is applied, a repetition of the OFDM SYM N R is generated. In the OFDM symbol repetition (OFDM SYM N R), the subcarriers are permuted such that the first modulated symbol in the repetition is mapped to the second subcarrier (n) and the second modulated symbol in the repetition is mapped to the first subcarrier (m) to differentiate from their counterpart modulated symbols in the original OFDM symbol (OFDM SYM N).

Figure 30:
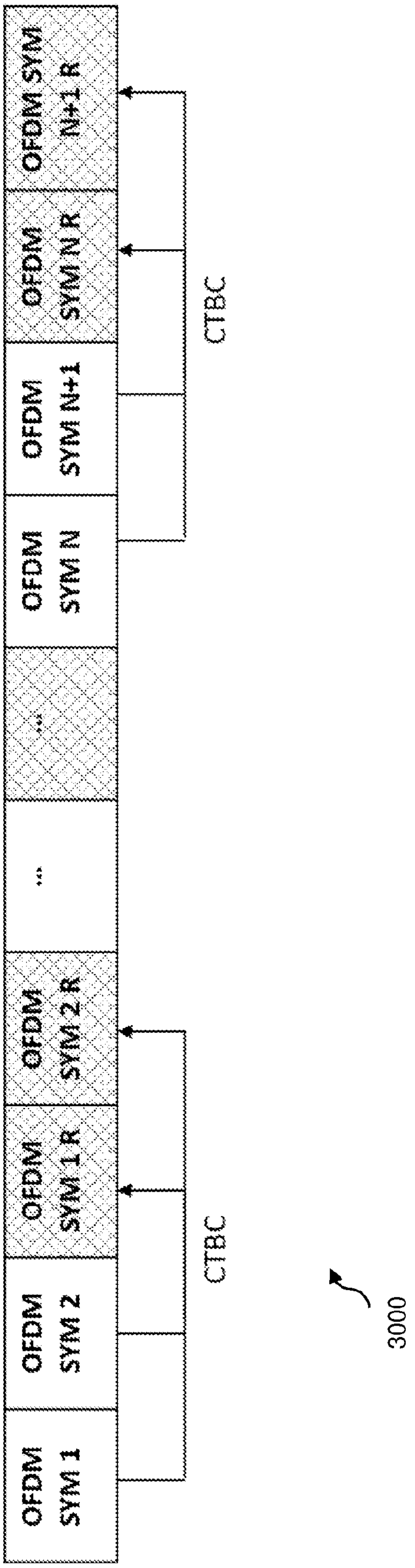
FIG. 30 shows an example payload portion of a PPDU where a yet another time-domain based repetition option is applied according to the sixth embodiment of the present disclosure.

FIG. 30 shows an example payload portion 3000 of a PPDU where a time-domain based repetition reliability improvement method under Option 3 is applied according to the sixth embodiment of the present disclosure. In this example, each pair of adjacent OFDM symbols are grouped into a OFDM block for CTBC processing and the number of OFDM symbol (block) repetitions is 2 (N=2). Accordingly, each pair of OFDM symbols (a OFDM block) is mapped to four (or two pairs) of OFDM symbols.

In particular, the payload portion of the PPDU may comprise multiple OFDM symbols (OFDM SYM 1, 2, . . . , N, N+1) and two adjacent OFDM symbols along the payload portion are grouped into a OFDM symbol block. When a time-domain based repetition reliability improvement method under Option 3 is applied, each OFDM symbol block (e.g., OFDM SYM 1 and OFDM SYM 2; and OFDM SYM N and OFDM SYM N+1) within the payload portion is duplicated once (N=2) such that there are two of the same OFDM SYM block before the next OFDM SYM block along the payload portion. The duplicated OFDM symbol block (OFDM SYM 1 R and OFDM SYM 2 R; OFDM SYM N R and OFDM SYM N+1 R) is allocated immediately after the original OFDM symbol block prior to the next OFDM symbol block. This will result not only in a reduction and adjustment of data rate to 1/N, thereby improving the reliability of the transmission, but also provide power gain and increased robustness as compared to Option 1.

CTBC is similar to STBC, but instead of mapping each SS into two spatial streams in the case of STBC, every pair of OFDM symbols (assuming a OFDM block comprising two OFDM symbol) is mapped to 2N OFDM symbols in the case of CTBC, where N is the number of repetitions. CTBC processing operates on the complex modulation symbols in sequential pairs of OFDM symbols. Same information bits from an OFDM symbol are mapped into more than one OFDM symbol. In order to add more frequency diversity, permutation inside OFDM symbol can be carried out as well.

This will result in a reduction and adjustment of data rate to 1/N, thereby improving the reliability of the transmission but only power gain is obtained because the channel state for adjacent OFDM symbols is quite similar.

When a time-domain based repetition reliability improvement method under Option 2 is applied, on top of the duplication of the OFDM symbol (OFDM SYM 1, 2, . . . , N) within the payload portion described in Option 1, the duplicated OFDM symbol (OFDM SYM R 1, 2, . . . , N) has its subcarrier permuted. This will result not only in a reduction and adjustment of data rate to 1/N, thereby improving the reliability of the transmission, but also provide power and diversity gain as compared to Option 1.

Figure 31:
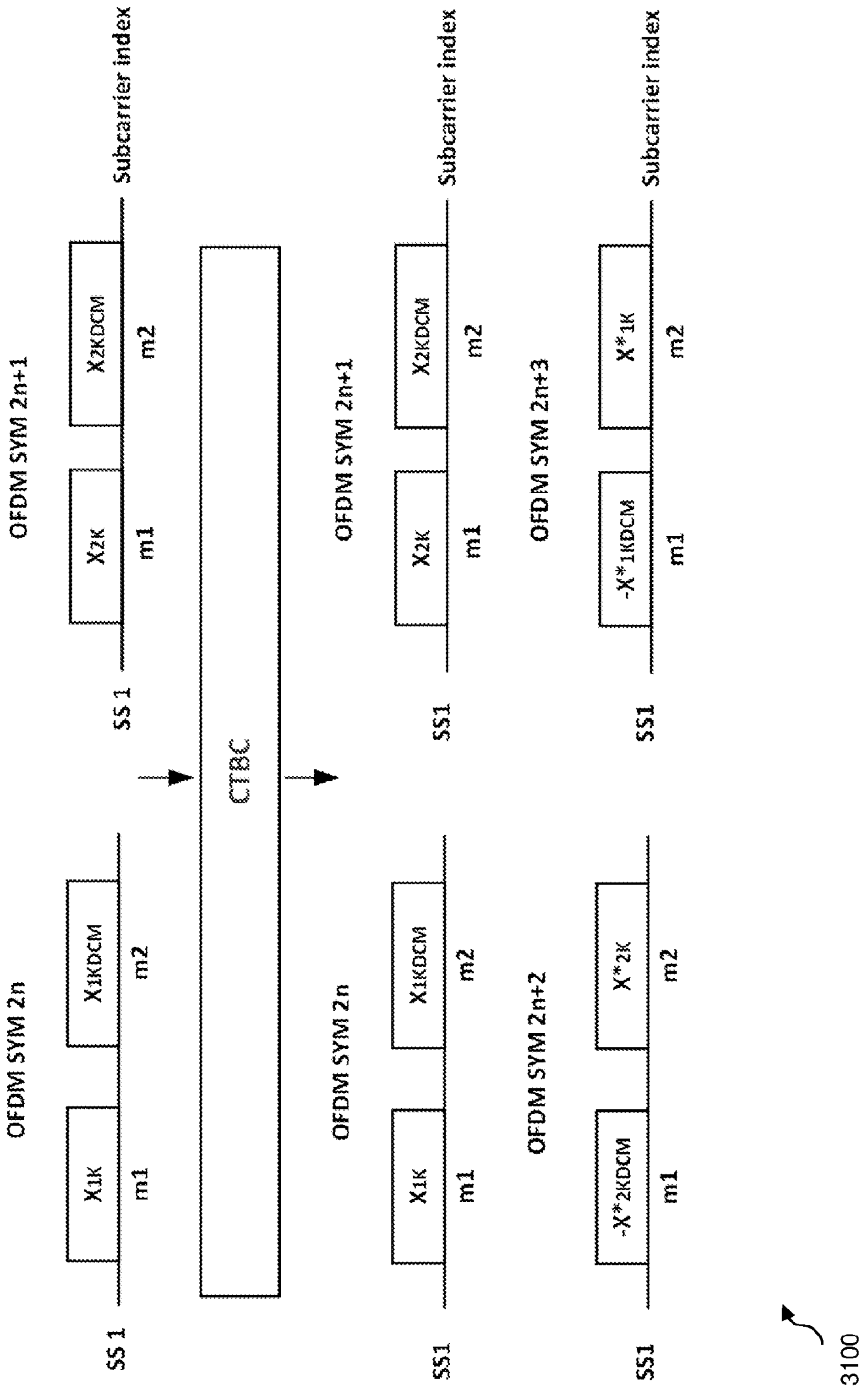
FIG. 31 shows a block diagram illustrating yet another time-domain based repetition option applied to two information bits from a spatial stream of two OFDM symbols to generate four OFDM symbols using sub-Carriers-time Block Coding scheme (CTBC) according to the sixth embodiment of the present disclosure.

FIG. 31 shows a block diagram 3100 illustrating a reliability improvement method under Option 3 applied to two information bits from a spatial stream of two OFDM symbols to generate four OFDM symbols using CTBC according to the sixth embodiment of the present disclosure.

An information bit $X_1$ from a spatial stream (e.g., first spatial steam SS1) is modulated using DCM scheme to a pair of modulation symbols $X_{1k}$ and $X_{1kDCM}$ mapped to subcarriers (m1, m2) on a OFDM symbol 2n; while an adjacent information bit $X_2$ from the spatial stream SS1 is also modulated using DCM scheme to a pair of modulation symbols $X_{2k}$ and $X_{2kDCM}$ mapped to the same subcarriers (m1, m2) on an adjacent OFDM symbol 2n+1.

The modulation symbols from SS1 of the OFDM symbol block comprising symbols 2n and 2n+1 are processed through a CTBC unit and duplicated to generate two duplicated OFDM SYMs 2n+2, 2n+3, each having the same modulated symbols mapped to subcarriers (m1, m2). In this example illustrated in FIG. 31, a permutation within a duplicated OFDM symbol is applied, thereby causing a switch in subcarrier mapping of the OFDM symbol. As such, the second modulated symbols mapped to the second subcarrier in the original OFDM symbol is mapped to the first subcarrier in the duplicated OFDM symbol and the first modulated symbols mapped to the first subcarrier in the original OFDM symbol is mapped to the second subcarrier in the duplicated OFDM symbol.

In addition, a permutation within duplicated OFDM symbol block (OFDM symbols 2n+2 and 2n+3) is applied, thereby causing a switch in the sequence of OFDM symbols within the duplicated OFDM symbol block. In particular, in the duplicated OFDM symbol block comprising the first OFDM symbol 2n+2 and the second OFDM symbol 2n+3, the first OFDM symbol 2n+2 comprises the modulation symbols $X_{2k}$, $X_{2kDCM}$ duplicated from the second OFDM symbol 2n+1 of the original OFDM symbol block while the second OFDM symbol 2n+3 comprises the modulated symbols $X^*_{1k}$, $-X^*_{1kDCM}$ duplicated from the first OFDM symbol 2n of the original OFDM symbol block. Furthermore, a phase rotation or sign inversion is also applied to a modulation symbol of a duplicated OFDM symbol (e.g., from $X^*_{1k}$, $X^*_{2k}$ in the duplicated OFDM symbols 2n+3 and 2n+2 respectively) to differentiate from the counterpart modulation symbol from other OFDM symbols.

Such DCM time-domain based repetition method can be applied on top of any enhanced frequency diversity scheme described across various embodiments in the present disclosure to further obtain robustness and frequency diversity according to the embodiment.

A receiver STA who receives a PPDU with a preamble indicating OFDM symbols are repeated is applied shall combine the symbols from different OFDM symbol blocks following the mapping before decoding and demodulating the PPDU to obtain the power gain and robustness gain.

Figure 32:
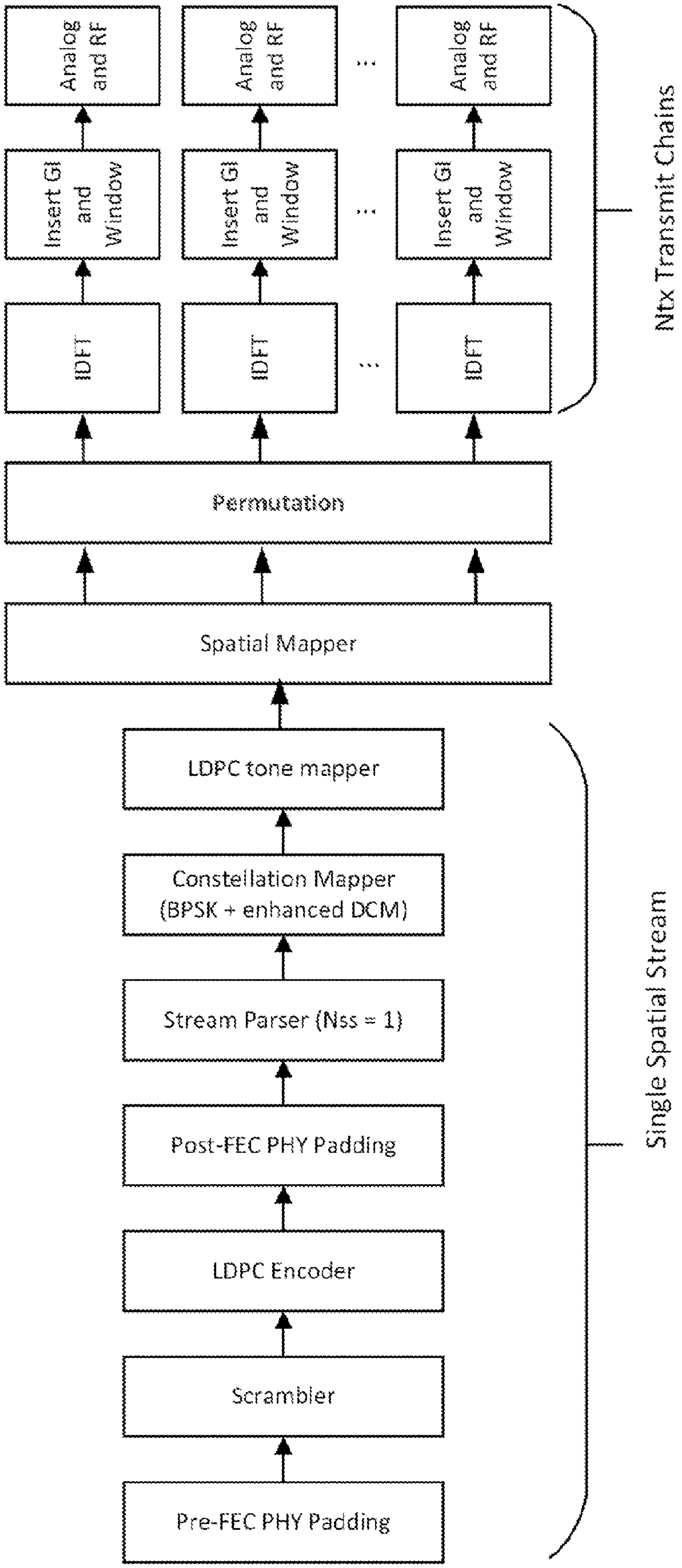
FIG. 32 shows a transmit block diagram illustrating a processing of a data field through an enhanced frequency diversity scheme with a reliability improvement method applied according to the sixth embodiment of the present disclosure.

FIG. 32 shows a transmit block diagram 3200 illustrating a processing of a data field through an enhanced frequency diversity scheme with a reliability improvement method applied according to the sixth embodiment of the present disclosure. The transmitter processing is similar to that shown in FIG. 5 using a Pre-FEC PHY Padding unit, a Scrambler unit, a LDPC Encoder unit, a Post-FEC PHY Padding unit, a Stream Parser unit ($N_{SS}$=1), a Constellation Mapper unit and a LDPC Tone Mapper unit to process a single spatial stream to process a single spatial stream. The spatial stream is then sent to a Spatial Mapper unit to map the spatial stream onto three transmit chains. Each transmit chain is also sent to a Permutation unit to perform OFDM symbol duplication and a permutation of the duplicated OFDM symbol (if necessary) before the transmit chain is sent to an IDFT unit to convert the OFDM subcarriers on the transmit chain into time-domain data for transmission.

In the following paragraphs, a seventh embodiment of the present disclosure where an application of an enhanced frequency diversity scheme, for example an enhanced frequency diversity scheme description in the first to fifth embodiments above, with another reliability improvement method, i.e., a frequency duplication of a payload portion of a signal, is described.

In particular, in the reliability improvement method according to the seventh embodiment, a ½ or ¼ based frequency duplication of a payload portion of a PPDU is applied when MCS15 or MCS14 is indicated respectively.

Figure 33:
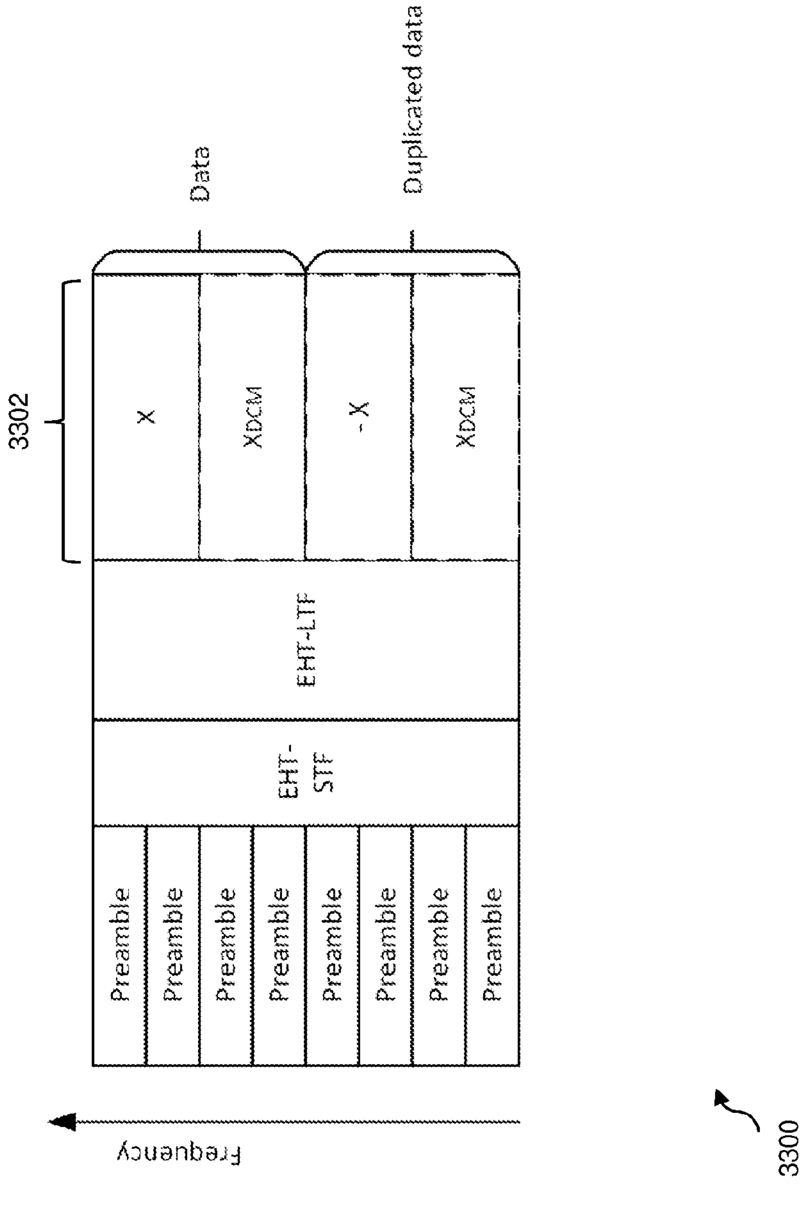
FIG. 33 shows an example 160 MHz PPDU with ½ based frequency duplication applied according to a seventh embodiment of the present disclosure.

FIG. 33 shows an example 160 MHz PPDU 3300 with ½ based frequency duplication applied according to the seventh embodiment of the present disclosure. The 160 MHz PPDU 3300 comprises a preamble portion, an EHT-STF, EHT-LTF and a payload portion 3302. In particular, in the ½ based frequency duplication, the 160 MHz frequency segment is divided into two halves: first half 80 MHz frequency segment and second half 80 MHz frequency segment. The information bit X in the payload portion 3302 of the 160 MHz PPDU 3300 is demodulated to two modulation symbols X and $X_{DCM}$ mapped to two 40 MHz frequency segments within the first 80 MHz frequency segment of the 160 MHz frequency segment, respectively, the two modulation symbols X and $X_{DCM}$ are duplicated and mapped to other two 40 MHz frequency segments within the second 80 MHz frequency segment of the 160 MHz frequency segment. This is similar to EHT DUP transmission where ½ based duplication is applied when MCS15 is indicated. It is noted that ½ based frequency duplication shall not be applied if the RU tone size is smaller than 52-tone.

Figure 34:
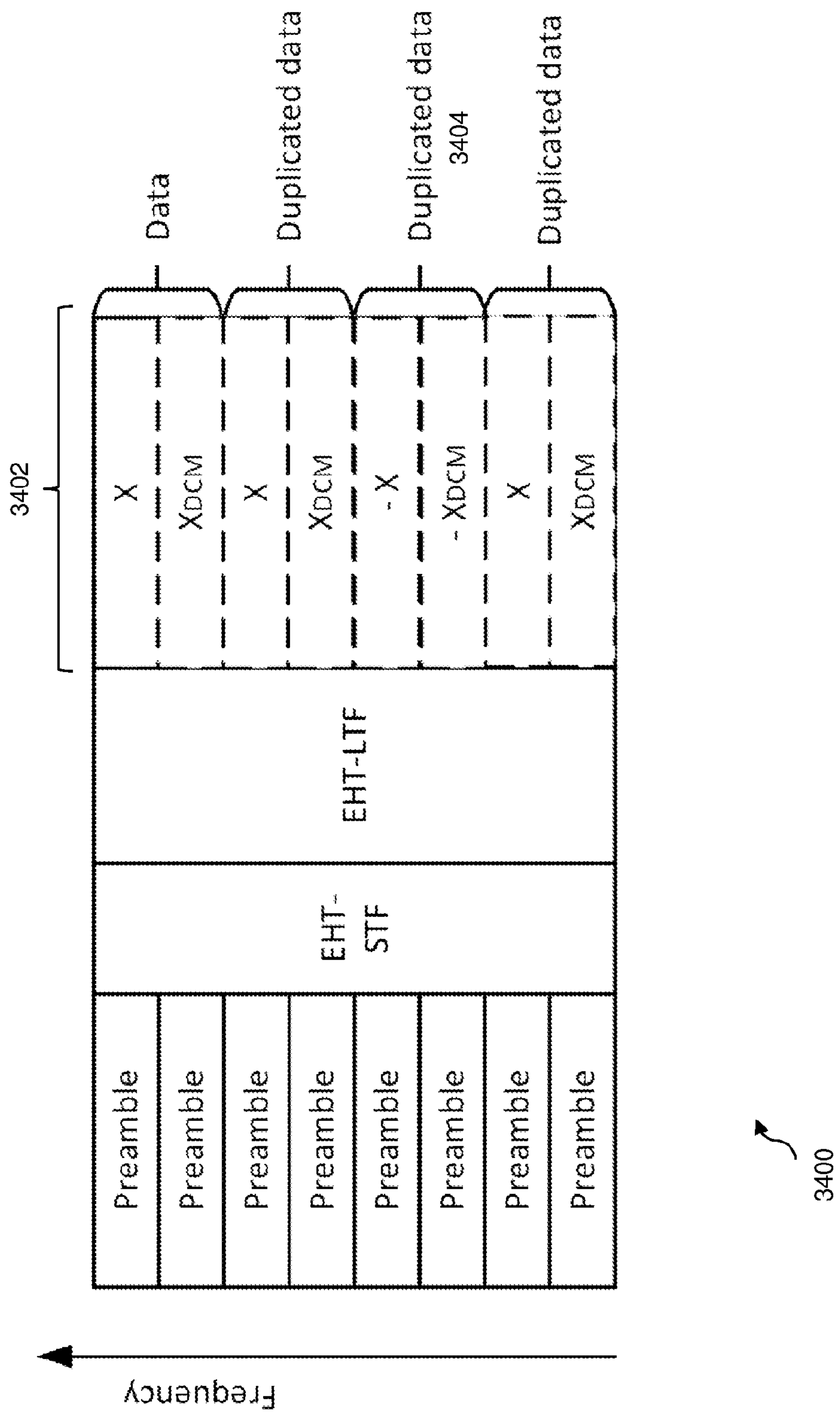
FIG. 34 shows an example 160 MHz PPDU with ¼ based frequency duplication applied according to the seventh embodiment of the present disclosure.

FIG. 34 shows an example 160 MHz PPDU 3400 with ¼ based frequency duplication applied according to the seventh embodiment of the present disclosure. The 160 MHz PPDU 3400 comprises a preamble portion, an EHT-STF, EHT-LTF and a payload portion 3402. In particular, in the ¼ based frequency duplication, the 160 MHZ frequency segment is divided into four quarters: first quarter 40 MHz frequency segment, second quarter 40 MHz frequency segment, third quarter 40 MHz frequency segment and fourth quarter 40 MHz frequency segment. The information bit X in the payload portion 3402 of the 160 MHz PPDU 3400 is demodulated to two modulation symbols X and $X_{DCM}$ mapped to two 20 MHz frequency segments within the first quarter 40 MHz frequency segment of the 160 MHz frequency segment, respectively, the two modulation symbols X and $X_{DCM}$ are duplicated and mapped to two 20 MHz frequency segments within each of the remaining second, third and fourth quarter 40 MHz frequency segment of the 160 MHz frequency segment. In addition, a phase rotation or sign inversion may be applied to one or both of the duplicated modulation symbols, as illustrated in the duplicated modulation symbols 3404 in the third quarter 40 MHz frequency segment.

Advantageously, under such reliability improvement method, an adjustment to ½ data rate can be achieved and further frequency diversity can be obtained. Such reliability improvement method according to the seventh embodiment can also be applied together with any one of various reliability improvement method described in the sixth and eight embodiments of the present disclosure to further reduce data rate and improve reliability.

Figure 35:
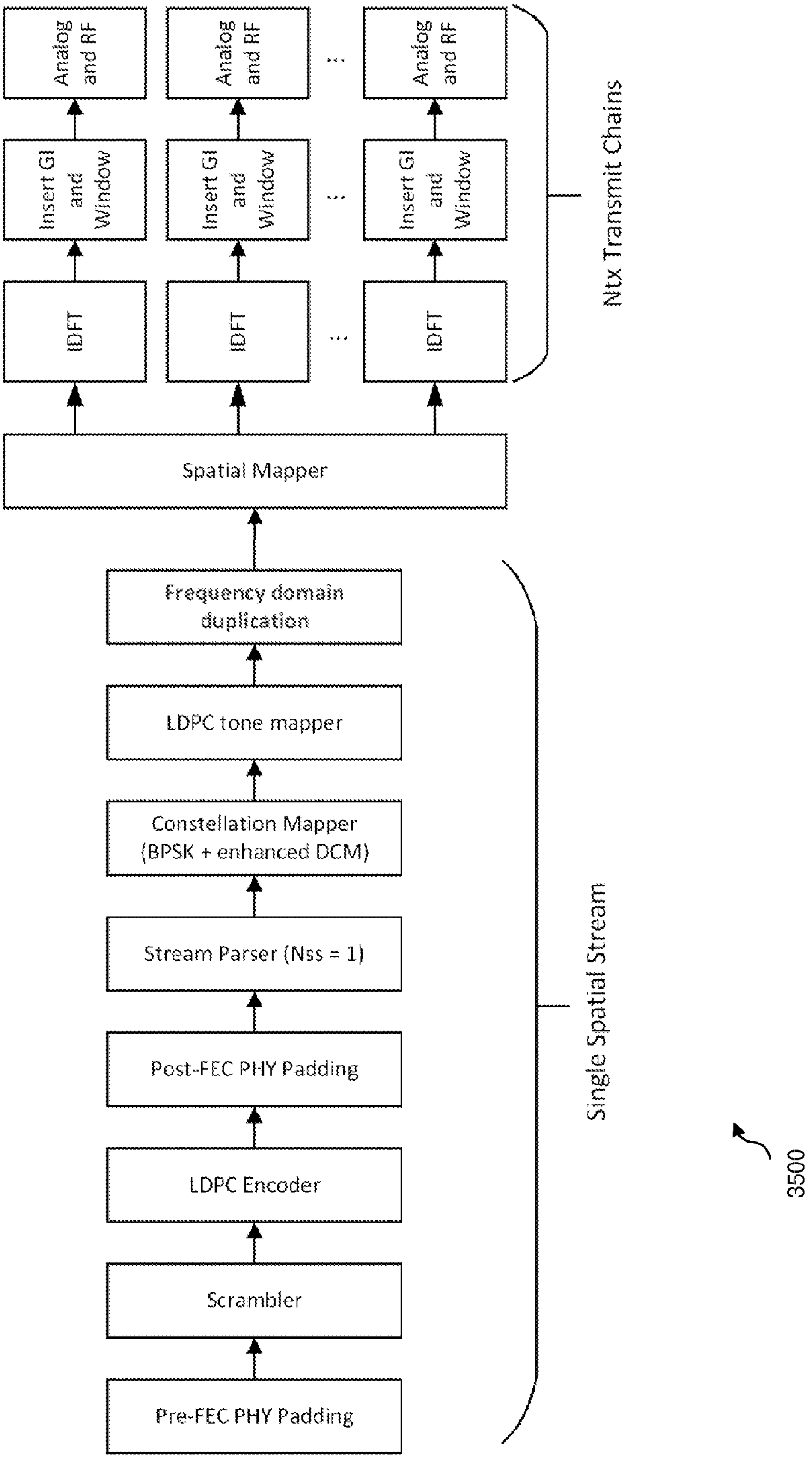
FIG. 35 shows a transmit block diagram illustrating a processing of a data field through an enhanced frequency diversity scheme according to the seventh embodiment of the present disclosure.

FIG. 35 shows a transmit block diagram 3500 illustrating a processing of a data field through an enhanced frequency diversity scheme according to the seventh embodiment of the present disclosure. The transmitter processing is similar to that shown in FIG. 5 using a Pre-FEC PHY Padding unit, a Scrambler unit, a LDPC Encoder unit, a Post-FEC PHY Padding unit, a Stream Parser unit ($N_{SS}$=1), a Constellation Mapper unit and a LDPC Tone Mapper unit to process a single spatial stream to process a single spatial stream. Specifically, in this seventh embodiment, after the LDPC Tone Mapper unit, the spatial stream is sent to a Frequency Domain Duplication unit to generate duplication of the modulated data in other frequency segments before the spatial stream is sent to a Spatial Mapper unit to map onto three transmit chains.

In the following paragraphs, an eighth embodiment of the present disclosure where an application of an enhanced frequency diversity scheme, for example an enhanced frequency diversity scheme description in the first to fifth embodiments above, with yet another reliability improvement method through an information block generation or a code block concatenation scheme, is described.

In 802.11, LDPC is the encoding scheme for the payload portion of a PPDU and the LDPC encoder supports 648, 1296 and 1944 code block lengths. The LDPC encoder encodes an information block, $c=(i_0, i_1, \ldots, i_{k-1})$ of size k into a codeword c of size n, $c=(i_0, i_1, \ldots, i_{k-1}, p_0, p_1, \ldots, p_{n-k-1})$, by adding n-k parity bits so that $H \times C^T=0$, where H is an (n−k)×n parity-check matrix.

There are two different options/examples to define LDPC scheme for encoding an information block according to the eighth embodiment: (1) to define a LDPC scheme with a rate 1/N where N is an integer larger than 2, by increasing the parity bits; (2) to define LDPC scheme with rate K/N by changing the information block size, where K is the number of information bits and an integer larger than 0; and N is a data rate adjustment factor and is an integer larger than 2.

Table 4 shows LDPC information block lengths encoded under Option 1 according to the eighth embodiment from various codeword block lengths supported by LDPC encoders when the coding rate is ¼. In other to support LDPC with rate a 1/N, corresponding prototype matrices $P_1$, $P_2$, $P_3$ are defined for the parity check matrixes with size $$\frac{1944}{N} \times \frac{1944(N-1)}{N}, \frac{1296}{N} \times \frac{1296(N-1)}{N}, \frac{648}{N} \times \frac{648(N-1)}{N}.$$

TABLE 4

| Coding rate | LDPC information block length (bits) | LDPC codeword block length (bits) |
|---|---|---|
| ¼ | 486 | 1944 |
| ¼ | 324 | 1296 |
| ¼ | 162 | 648 |

Figure 36:
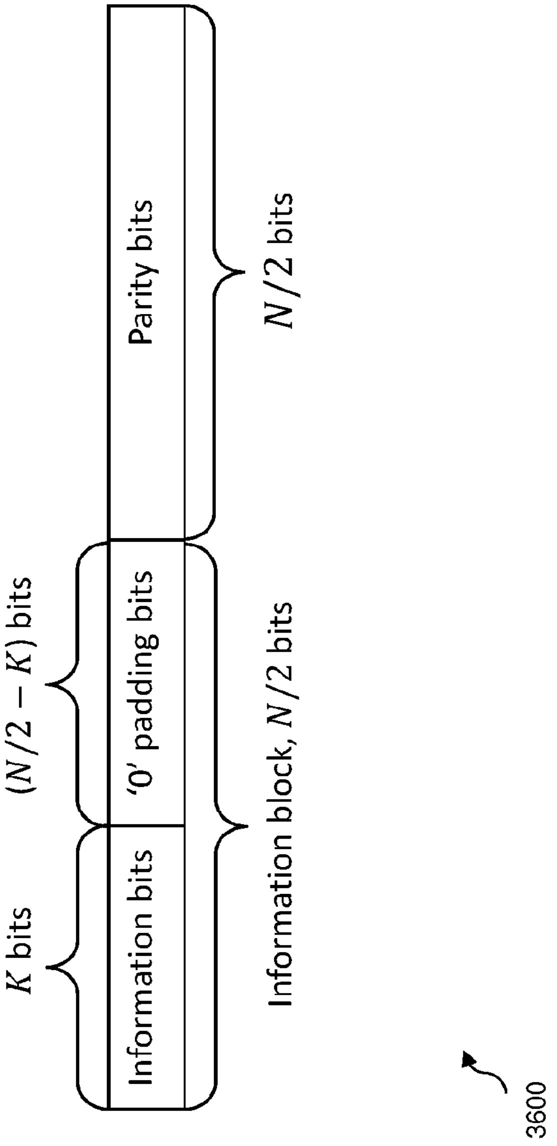
FIG. 36 shows a first example codeword in a payload portion of a PPDU generated using a special LDPC encoding scheme according to the eighth embodiment of the present disclosure.
Figure 37:
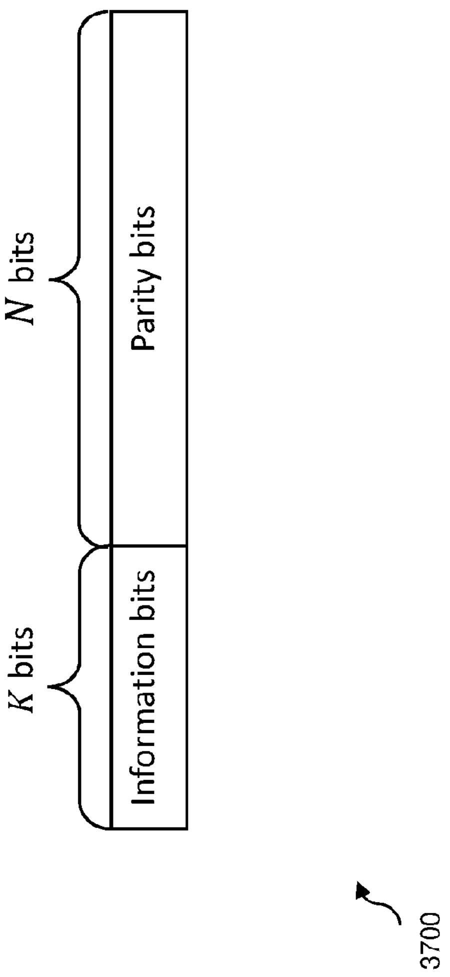
FIG. 37 shows a second example codeword in a payload portion of a PPDU generated using a special LDPC encoding scheme according to the eighth embodiment of the present disclosure.
Figure 38:
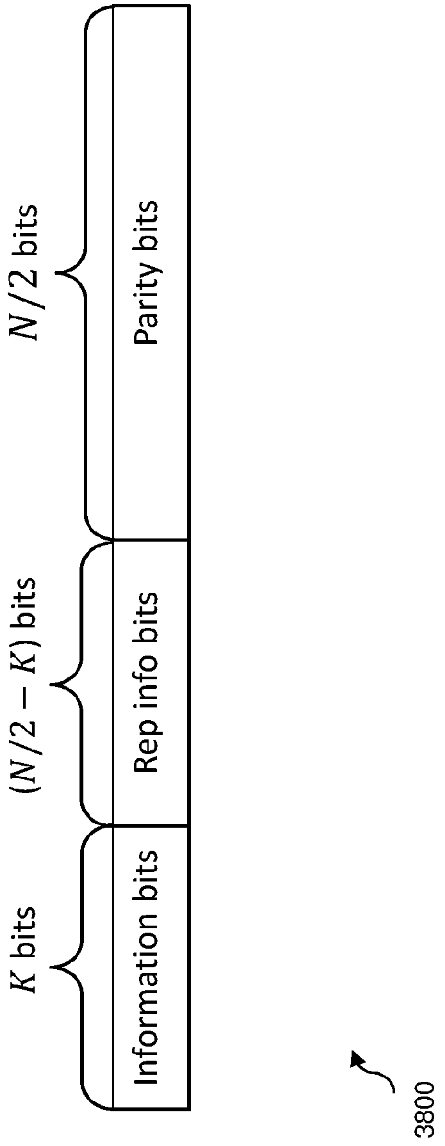
FIG. 38 shows a third example codeword in a payload portion of a PPDU generated using a special LDPC encoding scheme according to the eighth embodiment of the present disclosure.

FIG. 36 shows a first example codeword 3600 in a payload portion of a PPDU generated under Option 2 according to the eighth embodiment of the present disclosure. FIG. 37 shows a second example codeword 3700 in a payload portion of a PPDU generated under Option 2 according to the eighth embodiment of the present disclosure. FIG. 38 shows a third example codeword 3800 in a payload portion of a PPDU generated under Option 2 according to the eighth embodiment of the present disclosure.

Referring to FIG. 36, '0' padding bits of (N/2−K) bits are added to information bits (K bits) to form an information block of N/2 bits. The parity bits of the same N/2 bits are generated from the information block, at rate 1/2 to form the codeword. After the parity bits are generated, the transmitter may transmit either only the information bits with the parity bits, or repeated information bits with the parity bits. In this example, the length of codeword is the same as the current specification so a similar LDPC tone mapping can be used.

Alternatively, as illustrated in FIG. 37, no padding bit is added to information bits (K bits) and the information block contains only the information bits while parity bits of N bits are added to form the codeword. In this example, the length of codeword may be different from the current specification and therefore a different LDPC tone mapping method may be used.

Alternatively, as illustrated in FIG. 38, instead of adding of (N/2−K) bits of padding bit, the information bits are repeated in the codeword at (N/2-K) bits. The parity bits of the same N/2 bits are generated from the information block, at rate 1/2 to form the codeword. In this example, the length of codeword is the same as the current specification so a similar LDPC tone mapping can be used.

Additionally or alternatively, beside defining the LDPC scheme to encode an information block, the reliability improvement method according to the eighth embodiment can also be achieved concatenating N code blocks generated from same information block(s). While a code block is generated from an information block by adding parity bits, different code blocks can be generated by encoding the same information block with different parity check matrices and the different code blocks are concatenated to improve transmission reliability.

Figure 39:
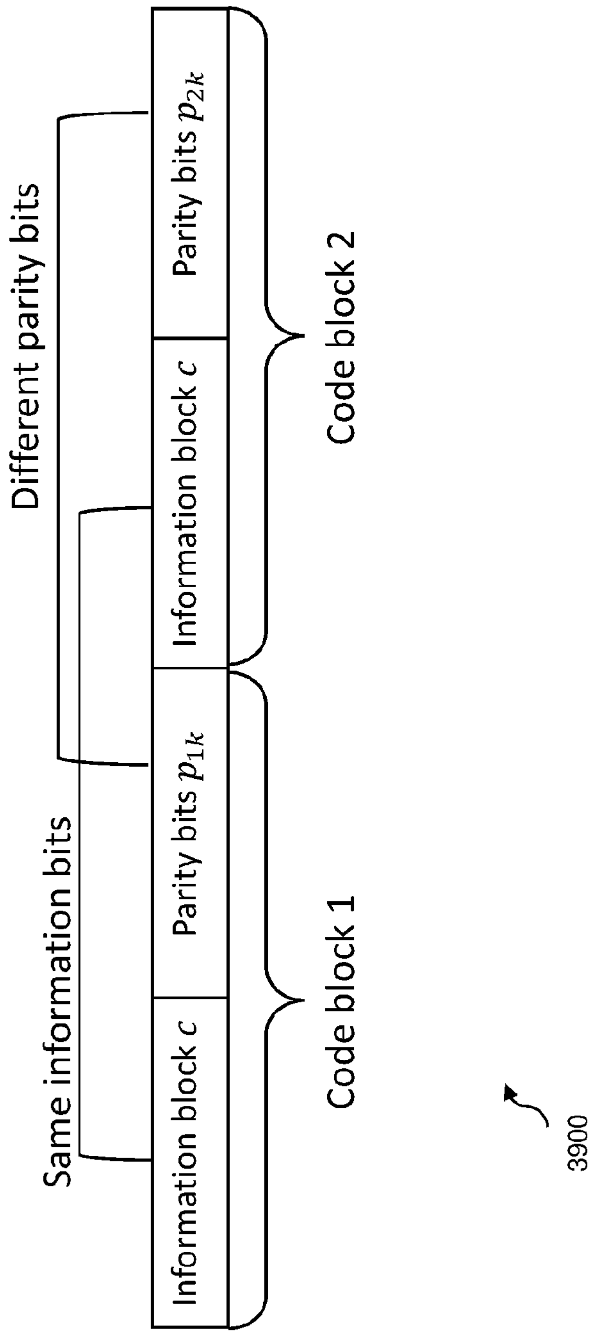
FIG. 39 shows an example codeword comprising two concatenated code blocks generated from an information block using another special LDPC encoding scheme according to the eighth embodiment of the present disclosure.

FIG. 39 shows an example codeword 3900 comprising two concatenated code blocks generated from an information block according to the eighth embodiment of the present disclosure. The information block c comprises information bits and the LDPC encoder encodes the information block to 2 code blocks at rate 1/2 with different parity bits ($p_{1k}$ and $p_{2k}$) respectively. Inside each code block, the coding rate is ½ but among the whole payload portion, the coding rate is ½N. In order to support rate concatenated LDPC, corresponding prototype matrixes $P_1$, $P_2$, $P_3$ that are different from current prototype matrixes are defined for codeword block length 648, 1296, 1944 at coding rate 1/2 for the different parity check matrices.

With the reliability improvement method through an information block generation or a code block concatenation scheme according to the eighth embodiment, a lower data rate as compared to that of 802.11be can be achieved and new prototype and encoding mechanism are required.

Figure 40:
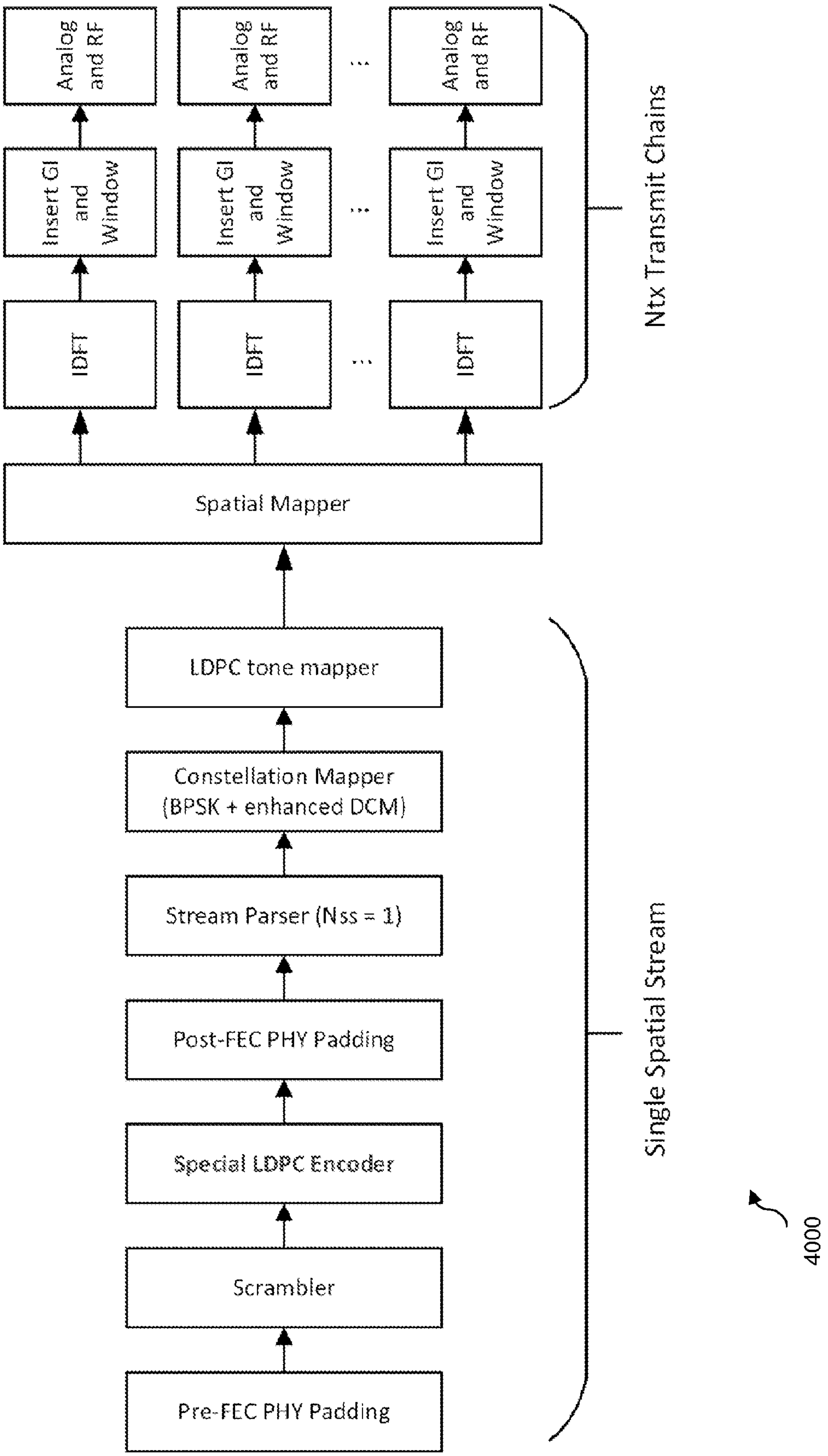
FIG. 40 shows a transmit block diagram illustrating a processing of a data field through an enhanced frequency diversity scheme according to the eighth embodiment of the present disclosure.

FIG. 40 shows a transmit block diagram 4000 illustrating a processing of a data field through an enhanced frequency diversity scheme according to the eighth embodiment of the present disclosure. The transmitter processing is similar to that shown in FIG. 5 using a Pre-FEC PHY Padding unit, a Scrambler unit, a LDPC Encoder unit, a Post-FEC PHY Padding unit, a Stream Parser unit ($N_{SS}$=1), a Constellation Mapper unit and a LDPC Tone Mapper unit to process a single spatial stream to process a single spatial stream. Specifically, in this eighth embodiment, the LDPC Encoder unit is a special LDPC Encoder unit that is able to encode the information block by adding parity bits and repeated information bits before sending the encoded bits to the Post-FEC PHY Padding unit.

As described above, the embodiments of the present disclosure provide an advanced communication system, communication methods and communication apparatuses for subcarriers modulation across multiple spatial streams in MIMO WLAN networks.

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system on a chip (SoC), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, an FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

It will be understood that while some properties of the various embodiments have been described with reference to a device, corresponding properties also apply to the methods of various embodiments, and vice versa.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects illustrative and not restrictive.

The invention claimed is:

1. A first communication apparatus, comprising:

circuitry, which, in operation, is configured to set first information indicating whether a mapping of two or more modulation symbols modulated from an information bit of a signal to two or more subcarriers is applied across two or more spatial streams of an orthogonal frequency division multiplexing (OFDM) symbol and second information indicating whether a data rate adjustment is applied to the signal; and a transmitter, which, in operation, transmits the signal with the mapping of the two or more modulation symbols across the two or more spatial streams and/or the data rate adjustment, the signal comprising the first information and the second information.

2. The first communication apparatus of claim 1, wherein the circuitry is further configured to set a signal field of the signal relating to one or both of a modulation coding scheme and a number of spatial streams ($N_{SS}$) to comprise one or both of the first information and the second information.

3. The first communication apparatus of claim 1, wherein the mapping comprises a mapping of two of the two or more modulation symbols modulated from the information bit to a first subcarrier of the two or more subcarriers in a first spatial stream of the two or more spatial streams and a second subcarrier of the two or more subcarriers in a second spatial stream of the two or more spatial streams of the OFDM symbol, respectively.

4. The first communication apparatus of claim 1, wherein the mapping comprises a same mapping of two of the two or more modulation symbols modulated from the information bit to the two or more subcarriers in every spatial stream of the two or more spatial streams.

5. The first communication apparatus of claim 1, wherein the mapping comprises a mapping of two of the two or more modulation symbols modulated from a first information bit of the signal to the two or more subcarriers in a first spatial stream of the two or more spatial streams of the OFDM symbol and in a second spatial stream of the two or more spatial streams of an adjacent OFDM symbol, and a mapping of two of the two or more modulation symbol modulated from a second information bit of the signal to the two or more subcarriers in a second spatial stream of the two or more spatial streams of the OFDM symbol and in a first spatial stream of the two or more spatial streams of the adjacent OFDM symbol; and the transmitter transmits the signal through the first spatial streams and the second spatial streams of the OFDM symbol and the adjacent OFDM symbols.

6. The first communication apparatus of claim 4, wherein the mapping further comprises a phase rotation, a sign inversion or a conjugation to one of the two or more modulation symbols mapped to one of the two or more subcarriers in one of the two or more spatial streams of the OFDM symbol.

7. The first communication apparatus of any one of claim 4, wherein the mapping comprises a switch of two of the two or more modulation symbols mapped to two of the two or more subcarriers in one of the two or more spatial streams.

8. The first communication apparatus of claim 1, wherein the data rate adjustment corresponds to a duplication of the OFDM symbol in a payload portion of the signal; and the transmitter transmits the signal comprising the OFDM symbol and one or more duplications of the OFDM symbol next to the OFDM symbol in the payload portion.

9. The first communication apparatus of claim 1, wherein the data rate adjustment corresponds to a duplication of the OFDM symbol block in a payload portion of the signal; and the transmitter transmits the signal comprising a OFDM symbol block and one or more duplications of the OFDM symbol block next to the OFDM symbol block in the payload portion, the OFDM symbol block comprising the OFDM symbol and one or more adjacent OFDM symbols.

10. The first communication apparatus of claim 8, wherein the data rate adjustment comprises a switch of two of the two or more modulation symbols mapped to two of the two or more subcarriers in one of the one or more duplications of the OFDM symbol.

11. The first communication apparatus of any one of claim 8, wherein the mapping further comprises a phase rotation, a sign inversion or a conjugation to one of the two or more modulation symbols mapped to one of the two or more subcarriers in one of the two or more spatial streams of the one of the one or more duplications of the OFDM symbol.

12. The first communication apparatus of claim 2, wherein the data rate adjustment corresponds to a frequency duplication of a payload portion of the signal; and the circuitry is further configured to generate the signal comprising the information bit in a first frequency segment and one or more duplications of the information bit in one or more second frequency segments of the payload portion of the signal, and set the first information indicating whether a mapping of two or more modulation symbols modulated from the information bit and the one or more duplications of the information bit of the signal to the two or more subcarriers is applied across the two or more spatial streams of the OFDM symbol.

13. The first communication apparatus of claim 12, wherein the signal field relating to the modulation coding scheme indicates a number of duplications of the one or more duplications of the information bit in the one or more second frequency segments of the payload portion.

14. The first communication apparatus of claim 1, wherein the second information comprises a coding rate, the data rate adjustment corresponds to a formation of an information bit block in a payload portion of the signal, and the information bit block comprises a plurality of the data bits, wherein the circuitry is further configured to generate the signal comprising the information bit block and one or more parity bits in the payload portion of the signal, and set the first information indicating whether a mapping of two or more modulation symbols modulated from the information bit block is applied across the two or more spatial streams of the OFDM symbol, wherein a number of the one or more parity bits depends on the coding rate.

15. The first communication apparatus of claim 14, wherein the information bit block comprises one of (i) one or more padding bits and (ii) one or more repetitions of the plurality of data bits, wherein both a number of the padding bits and a number of repetitions of the plurality of data bits depend on the coding rate.

16. A second communication apparatus, comprising:

a receiver, which, in operation, receives a signal comprising first information indicating whether a mapping of two or more modulation symbols modulated from an information bit of the signal to two or more subcarriers is applied across two or more spatial streams of an OFDM symbol and second information indicating whether a data rate adjustment is applied to the signal; and circuitry, which, in operation, is configured to decode and demodulate the signal to obtain information of the information bit mapped to the two or more spatial streams.

17. The second communication apparatus of claim 16, wherein the signal comprises a signal field relating to one or both of a modulation coding scheme and a number of spatial streams ($N_{SS}$), the signal field comprising either or both of the first information and the second information.

18. A communication method implemented by a first communication apparatus, comprising:

setting first information indicating whether a mapping of two or more modulation symbols modulated from an information bit of a signal to two or more subcarriers is applied across two or more spatial streams of an OFDM symbol and second information indicating whether a data rate adjustment is applied to the signal; and transmitting the signal with the mapping of the two or more modulation symbols across the two or more spatial streams and/or the data rate adjustment, the signal comprising the first information and the second information.

19. A communication method implemented by a second communication apparatus, comprising:

receiving a signal comprising first information indicating whether a mapping of two or more modulation symbols modulated from an information bit of the signal to two or more subcarriers is applied across two or more spatial streams of an OFDM symbol and second information indicating whether a data rate adjustment is applied to the signal; and decoding and demodulating the signal to obtain information of the information bit mapped to the two or more spatial streams.

* * * * *